United States Patent
Kuman et al.

(10) Patent No.: US 10,099,446 B2
(45) Date of Patent: Oct. 16, 2018

(54) HEAT INSULATING SHEET, HEAT INSULATING MATERIAL, METHOD OF MANUFACTURING HEAT INSULATING SHEET, AND METHOD OF MANUFACTURING HEAT INSULATING MATERIAL

(71) Applicants: KANEKA CORPORATION, Osaka-shi, Osaka (JP); TOCHIGI KANEKA CORPORATION, Tochigi (JP)

(72) Inventors: Tsuyoshi Kuman, Tochigi (JP); Shuzou Imai, Tochigi (JP); Atsushi Kumasaki, Tochigi (JP); Masaharu Iwai, Tochigi (JP)

(73) Assignees: KANEKA CORPORATION, Osaka-Shi (JP); TOCHIGI KANEKA CORPORATION, Mohka-Shi (JP)

( * ) Notice: Subject to any disclaimer, the term of this patent is extended or adjusted under 35 U.S.C. 154(b) by 343 days.

(21) Appl. No.: 14/796,199

(22) Filed: Jul. 10, 2015

(65) Prior Publication Data
US 2015/0314552 A1    Nov. 5, 2015

Related U.S. Application Data

(63) Continuation of application No. PCT/JP2014/000046, filed on Jan. 8, 2014.

(30) Foreign Application Priority Data

Jan. 11, 2013    (JP) .................................. 2013-003948

(51) Int. Cl.
*B32B 3/24* (2006.01)
*B32B 3/26* (2006.01)
(Continued)

(52) U.S. Cl.
CPC ................ *B32B 3/266* (2013.01); *B32B 3/30* (2013.01); *B32B 5/022* (2013.01); *B32B 7/02* (2013.01);
(Continued)

(58) Field of Classification Search
CPC ............. B32B 3/266; Y10T 428/24281; Y10T 428/24289
(Continued)

(56) References Cited

U.S. PATENT DOCUMENTS 3,354,021 A    11/1967  Royet
2011/0130062 A1*  6/2011  Squires ..................... B32B 7/02
                                                      442/327

FOREIGN PATENT DOCUMENTS

CN    101736819 A    6/2010
FR    2884589 A1    10/2006
(Continued)

OTHER PUBLICATIONS

International Preliminary Report on Patentability and the translation of the Written Opinion of the International Searching Authority (Forms PCT/IB/338, PCT/IB/373 and PCT/ISA/237), dated Jul. 23, 2015, for International Application No. PCT/JP2014/000046.
(Continued)

*Primary Examiner* — William P Watkins, III
(74) *Attorney, Agent, or Firm* — Birch, Stewart, Kolasch & Birch, LLP

(57) ABSTRACT

It has been difficult to achieve weight reduction while satisfying a required insulation property in a heat insulating material configured by alternately stacking a metal vapor-deposited sheet and a net. A heat insulating sheet comprises: a first thermal conduction suppressing layer that suppresses thermal conduction; a first radiant heat reflecting layer that is placed on one surface side of the first thermal conduction
(Continued)

suppressing layer and reflects radiant heat; and a protruding portion protruding from a surface of the first radiant heat reflecting layer on an opposite side of a surface on which the first thermal conduction suppressing layer is stacked, the protruding portion containing a resin at least on its surface.

28 Claims, 16 Drawing Sheets

(51) Int. Cl.
*B32B 3/30* (2006.01)
*B32B 15/09* (2006.01)
*B32B 37/20* (2006.01)
*B32B 7/02* (2006.01)
*F16L 59/08* (2006.01)
*F16L 59/02* (2006.01)
*F16L 59/065* (2006.01)
*B32B 5/02* (2006.01)
*B32B 27/12* (2006.01)

(52) U.S. Cl.
CPC .............. *B32B 15/09* (2013.01); *B32B 27/12* (2013.01); *B32B 37/20* (2013.01); *F16L 59/029* (2013.01); *F16L 59/065* (2013.01); *F16L 59/08* (2013.01); *B32B 2262/0276* (2013.01); *B32B 2307/302* (2013.01); *B32B 2307/304* (2013.01); *Y10T 156/1007* (2015.01); *Y10T 428/24281* (2015.01); *Y10T 428/24289* (2015.01)

(58) Field of Classification Search
USPC ........................................................ 428/132
See application file for complete search history.

(56) References Cited

FOREIGN PATENT DOCUMENTS

| | | |
|---|---|---|
| JP | 58-78751 A | 5/1983 |
| JP | 8-238716 A | 9/1996 |
| WO | WO 2012/120890 A1 | 9/2012 |

OTHER PUBLICATIONS

Extended European Search Report dated Jan. 16, 2017, for European Application No. 14737950.7.
International Search Report, issued in PCT/JP2014/000046, dated Apr. 15, 2014.
Chinese Office Action and Search Report for Chinese Application No. 201610274089.X, dated Jul. 31, 2017, with English translation of the Office Action.
"The Complete Works of Chinese Technological Achievement," The Editorial Department of the Complete Works of Chinese Technological Achievement, Scientific and Technical Literature Publishing House, Nov. 30, 1992, pp. 299-300.
Chinese Office Action for Appl. No. 201610274089.X dated May 21, 2018 (w/ English translation).

* cited by examiner

HEAT INSULATION PROPERTY (W/m²)

| | | NEEDLE DIAMETER(mm) | | | | | | | CONVENTIONAL METHOD |
|---|---|---|---|---|---|---|---|---|---|
| | | NO HOLES | 0.1 | 0.5 | 0.7 | 1.0 | 1.3 | 2.4 | |
| | MAJOR AXIS LENGTH OF THROUGH-HOLES (μm) | 0 | 50 | 750 | 1200 | 1700 | 2000 | 4000 | |
| NON-WOVEN FABRIC DENSITY (g/m²) | VOID MAXIMUM DIAMETER OF NON-WOVEN FABRIC (μm) | | | | | | | | 1.17 |
| 20 | 10 | 1.13 | | | | | | | |
| 15 | 50 | | 0.89 | | | | | 1.15 | |
| 8 | 150 | | | 0.72 | | | 0.79 | | |
| 5 | 200 | | | | 0.63 | 0.69 | | | |
| 4 | 300 | | 0.97 | 0.85 | | 0.66 | 0.82 | | |
| 3 | 400 | | | | | | | | |
| 2 | 500 | 1.11 | | | | | | 1.02 | |

FIG. 7

UNIT mm

| n | X | Y | D1 | D2 | H1 | H2 | AREA(mm$^2$) |
|---|---|---|---|---|---|---|---|
| 1 | 24.978 | 22.512 | 16.670 | 16.797 | 1.246 | 0.412 | 0.513 |
| 2 | 25.026 | 22.456 | 16.677 | 16.881 | 1.129 | 0.513 | 0.480 |
| 3 | 25.265 | 22.947 | 17.063 | 16.608 | 1.319 | 0.442 | 0.423 |
| 4 | 25.100 | 22.605 | 16.832 | 16.535 | 1.151 | 0.418 | 0.435 |
| 5 | 24.924 | 22.995 | 16.972 | 17.261 | 1.131 | 0.484 | 0.429 |
| 6 | 24.972 | 22.676 | 17.199 | 17.332 | 1.258 | 0.453 | 0.448 |
| 7 | 25.422 | 22.300 | 16.586 | 16.810 | 1.187 | 0.439 | 0.409 |
| 8 | 25.407 | 22.623 | 16.879 | 16.948 | 1.224 | 0.425 | 0.410 |
| 9 | 25.103 | 22.571 | 16.928 | 16.751 | 1.168 | 0.427 | 0.393 |
| 10 | 24.975 | 22.472 | 17.025 | 17.115 | 1.285 | 0.432 | 0.435 |
| AVERAGE | 25.12 | 22.62 | 16.88 | 16.90 | 1.21 | 0.44 | 0.438 |

UNIT : μm

| n | 9 LAYERS OF "9-μm AL VAPOR-DEPOSITED SHEET/5-g/m² NON-WOVEN FABRIC SHEET" + 1 LAYER OF HEAT INSULATING SHEET: A | 10 LAYERS OF "9-μm AL VAPOR-DEPOSITED SHEET/5-g/m² NON-WOVEN FABRIC SHEET": B | HEAT NEEDLE MELTED RING PORTION, AVERAGE HEIGHT: H (A-B) |
|---|---|---|---|
| 1 | 636 | 613 | 23 |
| 2 | 644 | 620 | 24 |
| 3 | 642 | 616 | 26 |
| 4 | 659 | 608 | 51 |
| 5 | 640 | 620 | 20 |
| 6 | 663 | 616 | 47 |
| 7 | 632 | 606 | 26 |
| 8 | 660 | 613 | 47 |
| 9 | 650 | 617 | 33 |
| 10 | 643 | 623 | 20 |
| AVERAGE | 647 | 615 | 32 |

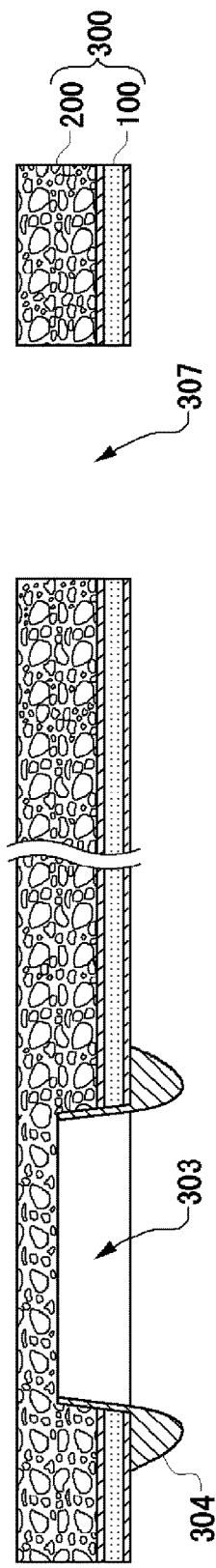

NON-WOVEN FABRIC DENSITY: 5 g/m$^2$
VOID MAXIMUM DIAMETER OF NON-WOVEN FABRIC: 200 μm

| HEAT NEEDLE DIAMETER(mm) | NO HOLES | 0.7 | CONVENTIONAL METHOD |
|---|---|---|---|
| PRESENCE OF OTHER THROUGH-HOLE | NO | YES | NO |
| MAJOR AXIS LENGTH OF THROUGH-HOLE(μm) | 0 | 1200 | — |
| HEAT INSULATION PROPERTY(W/m$^2$) | 1.12 | 0.68 | 1.17 |

FIG.16

NON-WOVEN FABRIC DENSITY: 5 g/m$^2$
VOID MAXIMUM DIAMETER OF NON-WOVEN FABRIC: 200 μm

| HEAT NEEDLE DIAMETER(mm) | NO HOLES | 0.7 | CONVENTIONAL METHOD |
|---|---|---|---|
| PRESENCE OF OTHER THROUGH-HOLE | NO | YES | NO |
| MAJOR AXIS LENGTH OF OPENING(μm) | 0 | 1200 | — |
| HEAT INSULATION PROPERTY(W/m$^2$) | 1.12 | 0.64 | 1.17 |

FIG.17

HEAT INSULATING SHEET, HEAT INSULATING MATERIAL, METHOD OF MANUFACTURING HEAT INSULATING SHEET, AND METHOD OF MANUFACTURING HEAT INSULATING MATERIAL

CROSS REFERENCE TO RELATED APPLICATIONS

This application is a Continuation of PCT International Application No. PCT/JP2014/000046 filed on Jan. 8, 2014, which claims priority under 35 U.S.C. § 119(a) to Patent Application No. 2013-003948 filed in Japan on Jan. 11, 2013, all of which are hereby expressly incorporated by reference into the present application.

BACKGROUND

1. Technical Field

The present invention relates to a heat insulating sheet, a heat insulating material, a method of manufacturing a heat insulating sheet, and a method of manufacturing a heat insulating material.

2. Related Art

A heat insulating material configured by alternately stacking, on both surfaces of a polyester resin sheet, a metal vapor-deposited film on which aluminum has been vacuum vapor-deposited and a net formed by weaving polyester fibers has been known. Patent Literature 1 discloses a stacked heat insulating material in which a low radiation rate layer and a low thermal conduction layer are alternately stacked.

[Patent Literature 1] Japanese Patent Application Publication No. S58-78751

It has been difficult to achieve weight reduction while satisfying a required insulation property in a heat insulating material configured by alternately stacking a metal vapor-deposited sheet and a net.

SUMMARY

A heat insulating sheet according to an aspect of the present invention comprises:
a first thermal conduction suppressing layer that suppresses thermal conduction;
a first radiant heat reflecting layer that is placed on one surface side of the first thermal conduction suppressing layer and reflects radiant heat; and
a protruding portion protruding from a surface of the first radiant heat reflecting layer on an opposite side of a surface on which the first thermal conduction suppressing layer is stacked, the protruding portion containing a resin at least on its surface.

In the heat insulating sheet, the first thermal conduction suppressing layer may contain the resin.

The heat insulating sheet may have an opening on the surface of the first radiant heat reflecting layer on the opposite side of the surface on which the first thermal conduction suppressing layer is stacked, and the protruding portion may be formed along an edge of the opening.

In the heat insulating sheet, the opening may be a through-hole penetrating the first radiant heat reflecting layer and the first thermal conduction suppressing layer.

The heat insulating sheet may further have another through-hole at a position that is different from a position of the opening on the surface of the first radiant heat reflecting layer on the opposite side of the surface on which the first thermal conduction suppressing layer is stacked, the other through-hole penetrating the first radiant heat reflecting layer and the first thermal conduction suppressing layer.

A heat insulating sheet according to an aspect of the present invention comprises:
a first thermal conduction suppressing layer that suppresses thermal conduction;
a first radiant heat reflecting layer that is placed on one surface side of the first thermal conduction suppressing layer and reflects radiant heat;
a second thermal conduction suppressing layer that is placed on another surface side of the first thermal conduction suppressing layer; and
a protruding portion protruding from a surface of the first radiant heat reflecting layer on an opposite side of a surface on which the first thermal conduction suppressing layer is stacked, the protruding portion containing a resin at least on its surface, wherein
the first radiant heat reflecting layer may have an opening on the surface on the opposite side of the surface on which the first thermal conduction suppressing layer is stacked, and
the protruding portion may be formed along an edge of the opening.

A heat insulating sheet according to an aspect of the present invention comprises:
a first thermal conduction suppressing layer that suppresses thermal conduction;
a first radiant heat reflecting layer that is placed on one surface side of the first thermal conduction suppressing layer and reflects radiant heat;
a second radiant heat reflecting layer that is placed on another surface side of the first thermal conduction suppressing layer;
a second thermal conduction suppressing layer that is placed on a surface side of the second radiant heat reflecting layer on an opposite side of a surface on which the first thermal conduction suppressing layer is stacked; and
a protruding portion protruding from a surface of the first radiant heat reflecting layer on an opposite side of a surface on which the first thermal conduction suppressing layer is stacked, the protruding portion containing a resin at least on its surface, wherein
the first radiant heat reflecting layer may have an opening on the surface on the opposite side of the surface on which the first thermal conduction suppressing layer is stacked, and
the protruding portion may be formed along an edge of the opening.

In the heat insulating sheet, the opening may be a through-hole penetrating the first radiant heat reflecting layer, the first thermal conduction suppressing layer, the second radiant heat reflecting layer, and the second thermal conduction suppressing layer.

In the heat insulating sheet, the protruding portion may have a joint portion that extends along an inner wall of the through-hole, and joins the first thermal conduction suppressing layer and the second thermal conduction suppressing layer.

The heat insulating sheet may further have another through-hole at a position that is different from a position of the opening on the surface of the first radiant heat reflecting layer on the opposite side of the surface on which the first thermal conduction suppressing layer is stacked, the other through-hole penetrating the first radiant heat reflecting layer, the first thermal conduction suppressing layer, the second radiant heat reflecting layer and the second thermal conduction suppressing layer.

In the heat insulating sheet,
the first thermal conduction suppressing layer may have a resin layer, and
the second thermal conduction suppressing layer may have a non-woven fabric layer containing resin fibers.

In the heat insulating sheet, the protruding portion may be formed with a mixture of respective materials of the resin layer and the non-woven fabric layer.

In the heat insulating sheet, the protruding portion may have a shape or size that does not allow entrance of the protruding portion into a void formed in the non-woven fabric layer.

A heat insulating sheet according to an aspect of the present invention comprises:
a first thermal conduction suppressing layer that suppresses thermal conduction;
a first radiant heat reflecting layer that is placed on one surface side of the first thermal conduction suppressing layer and reflects radiant heat; and
a protruding portion formed with a resin contained in the first thermal conduction suppressing layer being fused, and being deposited on another surface of the first thermal conduction suppressing layer, or on a surface of the first radiant heat reflecting layer on an opposite side of a surface on which the first thermal conduction suppressing layer is stacked, the protruding portion containing the resin at least on its surface.

The heat insulating sheet may further comprise:
a second radiant heat reflecting layer that is placed on another surface side of the first thermal conduction suppressing layer; and
a second thermal conduction suppressing layer that is placed on a surface side of the second radiant heat reflecting layer on an opposite side of a surface on which the first thermal conduction suppressing layer is stacked, the second thermal conduction suppressing layer having a non-woven fabric layer containing resin fibers, wherein
the protruding portion may be formed with the resin fibers, in addition to the resin, being fused, and being deposited on the surface of the first radiant heat reflecting layer on the opposite side of the surface on which the first thermal conduction suppressing layer is stacked.

In the heat insulating sheet,
the first radiant heat reflecting layer may have an opening on the surface on the opposite side of the surface on which the first thermal conduction suppressing layer is stacked, and
the protruding portion may be formed along an edge of the opening.

In the heat insulating sheet, the opening may be a through-hole penetrating the first radiant heat reflecting layer, the first thermal conduction suppressing layer, the second radiant heat reflecting layer, and the second thermal conduction suppressing layer.

In the heat insulating sheet, the protruding portion may have a joint portion that is formed with the resin and the resin fibers being fused, extends along an inner wall of the through-hole, and joins the first thermal conduction suppressing layer and the second thermal conduction suppressing layer.

In the heat insulating sheet, the protruding portion may have a shape or size that does not allow entrance of the protruding portion into a void formed in the non-woven fabric layer.

A heat insulating material according to an aspect of the present invention may be formed by stacking a plurality of the heat insulating sheet with the protruding portion being sandwiched therebetween.

The plurality of heat insulating sheets may include a first heat insulating sheet that has a first through-hole and a second heat insulating sheet that is placed to face the first heat insulating sheet and has a second through-hole, and
the first through-hole and the second through-hole may be provided at positions that do not overlap with one another in a stacking direction of the plurality of heat insulating sheets.

A method of manufacturing a heat insulating sheet, according to an aspect of the present invention, that comprises a stacked sheet that has: a first thermal conduction suppressing layer that suppresses thermal conduction; and a first radiant heat reflecting layer that is placed on one surface side of the first thermal conduction suppressing layer and reflects radiant heat comprises:
forming a protruding portion by causing a resin contained in the first thermal conduction suppressing layer to be deposited on at least one surface of the stacked sheet by fusing the resin, the protruding portion protruding from the at least one surface and containing the resin at least on its surface.

In the method, in the forming, an opening may be formed on the at least one surface of the stacked sheet, and the protruding portion may be formed along an edge of the opening.

In the method of manufacturing,
the stacked sheet further may have: a second radiant heat reflecting layer placed on another surface side of the first thermal conduction suppressing layer; and a second thermal conduction suppressing layer that is placed on a surface side of the second radiant heat reflecting layer on an opposite side of a surface on which the first thermal conduction suppressing layer is stacked,
the second thermal conduction suppressing layer may have a resin layer,
in the forming, in a state that a first sheet formed by stacking the first radiant heat reflecting layer, the first thermal conduction suppressing layer and the second radiant heat reflecting layer and a second sheet including the second thermal conduction suppressing layer are overlapped:
a through-hole penetrating the first sheet and the second sheet may be formed as the opening by sticking and then drawing a heat needle into and from a surface side of the first sheet on an opposite side of a surface on which the second sheet is stacked, or into and from a surface of the second sheet on an opposite side of a surface on which the first sheet is stacked;
the first sheet and the second sheet may be joined by a part of at least one of: the resin of the resin layer of the first thermal conduction suppressing layer; and the resin of the resin layer of the second thermal conduction suppressing layer, the resin being melted by sticking and drawing of the heat needle; and
the protruding portion along an edge of the through-hole may be formed by a part of at least one of: the resin of the resin layer of the first thermal conduction suppressing layer; and the resin of the resin layer of the second thermal conduction suppressing layer, the resin being melted by sticking and drawing of the heat needle.

A method of manufacturing a heat insulating material according to an aspect of the present invention comprises manufacturing a heat insulating material by stacking a plurality of heat insulating sheets manufactured by the method of manufacturing a heat insulating sheet, with the protruding portion being sandwiched therebetween.

The summary clause does not necessarily describe all necessary features of the embodiments of the present invention. The present invention may also be a sub-combination of the features described above.

BRIEF DESCRIPTION OF THE DRAWINGS

FIG. 7 is a table that shows one example of results obtained by measuring the insulation property of a heat insulating sheet by changing the density of a non-woven fabric sheet and the needle diameter of heat needles.

FIG. 8 is a table that shows one example of measurement results of numeric values about through-holes formed in a heat insulating sheet which is an evaluation sample.

FIG. 9 is a table that shows one example of measurement results about the height H of through-holes formed in a heat insulating sheet which is an evaluation sample.

FIG. 15 is one example of a partial cross-sectional view of a heat insulating sheet according to another example.

FIG. 16 is a table that shows one example of results obtained by measuring the insulation property of a heat insulating sheet that has through-holes and other through-holes.

FIG. 17 is a table that shows one example of results obtained by measuring the insulation property of a heat insulating sheet that has openings and other through-holes.

DESCRIPTION OF EXEMPLARY EMBODIMENTS

Hereinafter, (some) embodiment(s) of the present invention will be described. The embodiment(s) do(as) not limit the invention according to the claims, and all the combinations of the features described in the embodiment(s) are not necessarily essential to means provided by aspects of the invention.

Figure 1:
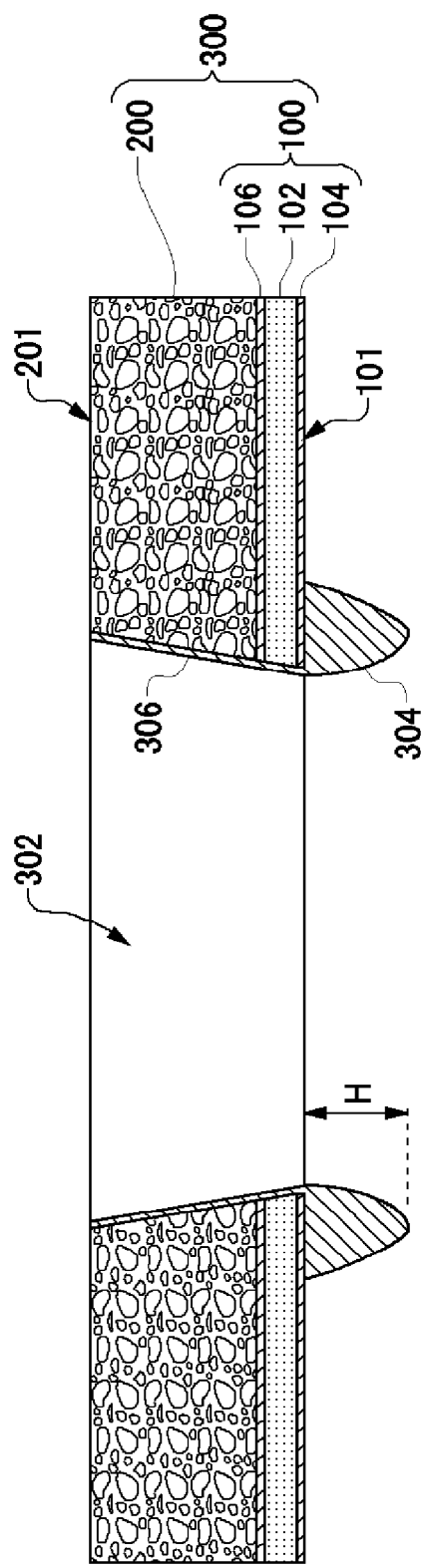
FIG. 1 is one example of a partial cross-sectional view of a heat insulating sheet according to the present embodiment.

FIG. 1 shows one example of a partial cross-sectional view of a heat insulating sheet 300 according to the present embodiment. The heat insulating sheet 300 comprises a metal vapor-deposited sheet 100 and a non-woven fabric sheet 200. The metal vapor-deposited sheet 100 has a resin layer 102 and metal layers 104 and 106.

The metal layer 104 is placed on one surface side of the resin layer 102, and the metal layer 106 is placed on another surface side of the resin layer 102. The metal layers 104 and 106 may be formed by vapor-deposition of metal on both surfaces of the resin layer 102. Also, the metal layers may be formed only on either surface of the resin layer 102.

The resin layer 102 is formed with a thermoplastic resin. For example, polyester, polyethylene, polypropylene, polyamide or the like may be used as the thermoplastic resin. A polyester material is desirably used in terms of the melting point, water-absorbing property, suitability for metal vapor-deposition, tear strength, weight, cost or the like. The resin layer 102 is one example of a first thermal conduction suppressing layer or second thermal conduction suppressing layer that suppresses thermal conduction.

For example, aluminum, gold, silver, copper, nickel or the like may be used as a metal to constitute the metal layers 104 and 106. Aluminum is desirably used as the metal in terms of the vertical infrared reflectance, easiness of vapor-deposition, uniformity of a vapor-deposited film, weight, cost or the like. The metal layers 104 and 106 are one example of a first radiant heat reflecting layer or second radiant heat reflecting layer that reflects radiant heat.

A method of vapor-depositing metal on the resin layer 102 is not particularly limited, but may be electro thermal heating, sputtering, ion plating, ion beam or the like performed by means of a continuous or batch vacuum vapor-deposition machine. The thickness of the metal layers 104 and 106 is not particularly limited, but is desirably 100 angstrom or larger and 1000 angstrom or smaller. The thickness of the metal layer 104 or 106 which is 100 angstrom or larger can further suppress the amount of infrared that passes through the metal layer 104 or 106 and can further suppress lowering of the insulation property. Also, the thickness of the metal layers 104 and 106 which is 1000 angstrom or smaller can further suppress increase in the thermal conductivity in the metal layers 104 and 106 and also can further suppress occurrence of cracks due to bending or the like at the time of construction.

The thickness of the metal vapor-deposited sheet 100 is desirably 3 μm or larger and 100 μm or smaller. The thickness of the metal vapor-deposited sheet 100 is further desirably 6 μm or larger and 50 μm or smaller. The thickness of the metal vapor-deposited sheet 100 which is 3 μm or larger can further suppress occurrence of wrinkles in the metal layer 104 or 106. The thickness of the metal vapor-deposited sheet 100 which is 6 μm or larger can further suppress occurrence of wrinkles in the metal layer 104 or 106. Also, the thickness of the metal vapor-deposited sheet 100 which is 100 μm or smaller can further suppress weight increase, can further suppress increase in the contact area between the metal vapor-deposited sheet 100 and the non-woven fabric sheet 200, and can further suppress lowering of the insulation property. Also, the thickness of the metal vapor-deposited sheet 100 which is 50 μm or smaller can further suppress weight increase, can further suppress increase in the contact area between the metal vapor-deposited sheet 100 and the non-woven fabric sheet 200, and can further suppress lowering of the insulation property.

Note that the thickness of the metal layers 104 and 106 is obtained by measuring the surface resistance value by means of a low resistivity meter with a 4-pin probe (Loretta-EP manufactured by Mitsubishi Chemical Analytic Co., Ltd.), and calculating the thickness of a vapor-deposited film by using the surface resistance value and the metallic filmspecific resistance value. The thickness of the metal vapor-deposited sheet 100 can be measured according to the method explained in JIS L 1913, Section 6.1, The non-woven fabric sheet 200 has a resin layer containing resin fibers. The non-woven fabric sheet 200 may have a structure formed by superimposing resin fibers multiple times. The resin fibers may be formed with a thermoplastic resin. For example, polyester, polyethylene, polypropylene, polyamide or the like can be used as the plastic resin. A polyester resin is desirably used in terms of the melting point, water-absorbing property, stretchability, tear strength, weight, cost or the like. The non-woven fabric sheet 200 is one example of a first thermal conduction suppressing layer or second thermal conduction suppressing layer that suppresses thermal conduction.

The density (weight per unit area) of the non-woven fabric sheet is desirably 2 g/m$^2$ or higher and 15 g/m$^2$ or lower. The density (weight per unit area) of the non-woven fabric sheet is more desirably 3 g/m$^2$ or higher and 15 g/m$^2$ or lower. In order to prevent thermal conduction, desirably the density is low, i.e. the weight per unit area is light, and the density of the non-woven fabric sheet is further desirably 3 g/m$^2$ or higher and 10 g/m$^2$ or lower. The density of the non-woven fabric sheet is preferably 2 g/m$^2$ or higher because the metal vapor-deposited sheets sandwiching the non-woven fabric sheet less likely contact each other. The density of the non-woven fabric sheet is preferably 3 g/m$^2$ or higher because the metal vapor-deposited sheets sandwiching the non-woven fabric sheet less likely contact each other. The density of the non-woven fabric sheet is preferably 15 g/m$^2$ or lower because the insulation property becomes better. Note that the density (weight per unit area) of the non-woven fabric sheet can be measured according to the method explained in JIS L 1913, Section 6.2.

The heat insulating sheet 300 comprises a through-hole 302 penetrating the metal vapor-deposited sheet 100 and the non-woven fabric sheet 200. The through-hole 302 is one example of an opening. The heat insulating sheet 300 further comprises a protruding portion 304 formed along the outer periphery of the through-hole 302. The protruding portion 304 contains a resin at least on its surface. Note that, in addition to the through-hole 302 penetrating the metal vapor-deposited sheet 100 and the non-woven fabric sheet 200, the heat insulating sheet 300 may comprise an opening on a surface of the metal vapor-deposited sheet 100 on an opposite side of a surface on which the non-woven fabric sheet 200 is stacked. The opening penetrates the metal vapor-deposited sheet 100, but does not penetrate the non-woven fabric sheet 200. The circumference of the opening on the surface of the metal vapor-deposited sheet 100 on the opposite side of the surface on which the non-woven fabric sheet 200 is stacked may have a protruding portion protruding along the edge of the opening and from the surface of the metal vapor-deposited sheet 100 on the opposite side of the surface on which the non-woven fabric sheet 200 is stacked. Also, in addition to the hole penetrating the metal vapor-deposited sheet 100, but not penetrating the non-woven fabric sheet 200, the heat insulating sheet 300 may comprise another through-hole around which a protruding portion is not formed.

The protruding portion 304 protrudes from a surface 101 of the metal vapor-deposited sheet 100 on the opposite side of the surface on which the non-woven fabric sheet 200 is stacked. The protruding portion 304 may protrude from a surface 201 of the non-woven fabric sheet 200 on an opposite side of a surface on which the metal vapor-deposited sheet 100 is stacked. The protruding portion 304 protrudes from the surface 101 of the metal vapor-deposited sheet 100 on the opposite side of the surface on which the non-woven fabric sheet 200 is stacked by the height H.

The heat insulating sheet 300 has a plurality of the through-holes 302 and a plurality of the protruding portions 304. Then, a heat insulating material can be configured by stacking a plurality of the heat insulating sheets 300 with the plurality of protruding portions 304 being sandwiched therebetween. The heat insulating material may be configured by, for example, overlapping one to 1000 pieces of, two to 100 pieces of, or three to 75 pieces of the heat insulating sheets 300. Because the protruding portions 304 protrude from the surface 101 of the metal vapor-deposited sheet 100, the protruding portions 304 function as a support between the heat insulating sheets 300. Accordingly, it is possible to prevent the stacked heat insulating sheets 300 from contacting each other at portions other than the protruding portions 304. Then, because the protruding portions 304 contain a resin on its surface, it is possible to further suppress thermal conduction that may occur due to contact between the heat insulating sheets 300, and to improve the insulation property of the heat insulating sheets 300. The surface of the protruding portions 304 may be covered with a resin.

Because the non-woven fabric sheet 200 may have a structure formed by superimposing multiple resin fibers, voids are formed between the resin fibers. Therefore, depending on the shape or size of the protruding portions 304, the protruding portions 304 may enter into voids formed in the non-woven fabric sheet 200 of an adjacent heat insulating sheet 300 when a plurality of heat insulating sheets 300 are stacked. In such a case, the protruding portions 304 do not function as a support, and may lower the insulation property of the heat insulating material.

To cope with this, the protruding portions 304 are desirably formed to have a shape or size that does not allow complete entrance of the protruding portions 304 into voids formed in the non-woven fabric sheet 200. For example, the diameter of the protruding portions 304 is made larger than the maximum diameter of voids formed in the non-woven fabric sheet 200. Thereby, it is possible to prevent entrance of the protruding portions 304 into voids of the non-woven fabric sheet 200. Then, when a plurality of the heat insulating sheets 300 are stacked, it is possible to prevent occurrence of thermal conduction and lowering of the insulation property that may occur due to contact between a plurality of the heat insulating sheets 300. Also, it is possible to aim for weight reduction of the heat insulating sheet 300 by using the non-woven fabric sheet 200. Therefore, it is possible to prevent lowering of the insulation property of the heat insulating material configured by stacking a plurality of the heat insulating sheets 300 and to aim for weight reduction.

Note that because the protruding portions 304 only have to function as a support between the heat insulating sheets 300 so that the heat insulating sheets 300 do not contact each other, the protruding portions 304 may have a shape or size that allows entrance of parts of the protruding portions 304, for example leading edge parts thereof, into voids formed in the non-woven fabric sheet 200. In other words, the protruding portions 304 only has to have a shape or size that does not allow entrance of at least parts of the protruding portions 304 into voids formed in the non-woven fabric sheet 200.

Here, the through-holes 302 may be formed by sticking and then drawing heat needles into and from a surface of the non-woven fabric sheet 200 on the opposite side of the surface on which the metal vapor-deposited sheet 100 is stacked in a state that the metal vapor-deposited sheet 100 and the non-woven fabric sheet 200 are superimposed. The through-holes 302 may be formed by sticking and then drawing heat needles into and from the surface of the metal vapor-deposited sheet 100 on the opposite side of the surface on which the non-woven fabric sheet 200 is stacked in a state that the metal vapor-deposited sheet 100 and the non-woven fabric sheet 200 are superimposed. Note that the through-holes 302 may be formed by a method other than sticking and drawing of heat needles.

Furthermore, by fusing resins contained in the metal vapor-deposited sheet 100 and the non-woven fabric sheet 200, the resins are deposited on at least either surface of: the surface of the metal vapor-deposited sheet 100 on the opposite side of the surface on which the non-woven fabric sheet 200 is stacked; and the surface of the non-woven fabric sheet 200 on the opposite side of the surface on which the metal vapor-deposited sheet 100 is stacked, thereby forming the protruding portion 304 along the edge of the through-hole 302. For example, the protruding portion 304 along the outer periphery of the through-hole 302 is formed by a part of the resins contained in the metal vapor-deposited sheet 100 and the non-woven fabric sheet 200 that are fused by heat needles. Therefore, the protruding portion 304 is formed by a mixture of materials contained in the metal vapor-deposited sheet 100 and the non-woven fabric sheet 200.

Also, the protruding portion 304 has an extended portion 306 that extends along an inner wall of the through-hole 302. The extended portion 306 functions as a joint portion that covers an inner wall of the through-hole 302 and joins the metal vapor-deposited sheet 100 and the non-woven fabric sheet 200. The protruding portion 304 and the extended portion 306 are formed in a process of sticking and then drawing a heat needle into and from the surface of the non-woven fabric sheet 200 on the opposite side of the surface on which the metal vapor-deposited sheet 100 is stacked, or into and from the surface of the metal vapor-deposited sheet 100 on the opposite side of the surface on which the non-woven fabric sheet 200 is stacked in a state that the metal vapor-deposited sheet 100 and the non-woven fabric sheet 200 are superimposed.

As mentioned above, the through-hole 302 is formed by sticking and drawing a heat needle in a state that the metal vapor-deposited sheet 100 and the non-woven fabric sheet 200 are superimposed. Then, the metal vapor-deposited sheet 100 and the non-woven fabric sheet 200 are welded together by a part of the resins that constitute the metal vapor-deposited sheet 100 and the non-woven fabric sheet 200 being melted by a heat needle. Furthermore, the protruding portion 304 is formed by a part of the resins that constitute the metal vapor-deposited sheet 100 and the non-woven fabric sheet 200 being melted by a heat needle and solidifying on the circumferential edge part of the through-hole 302.

Figure 2:
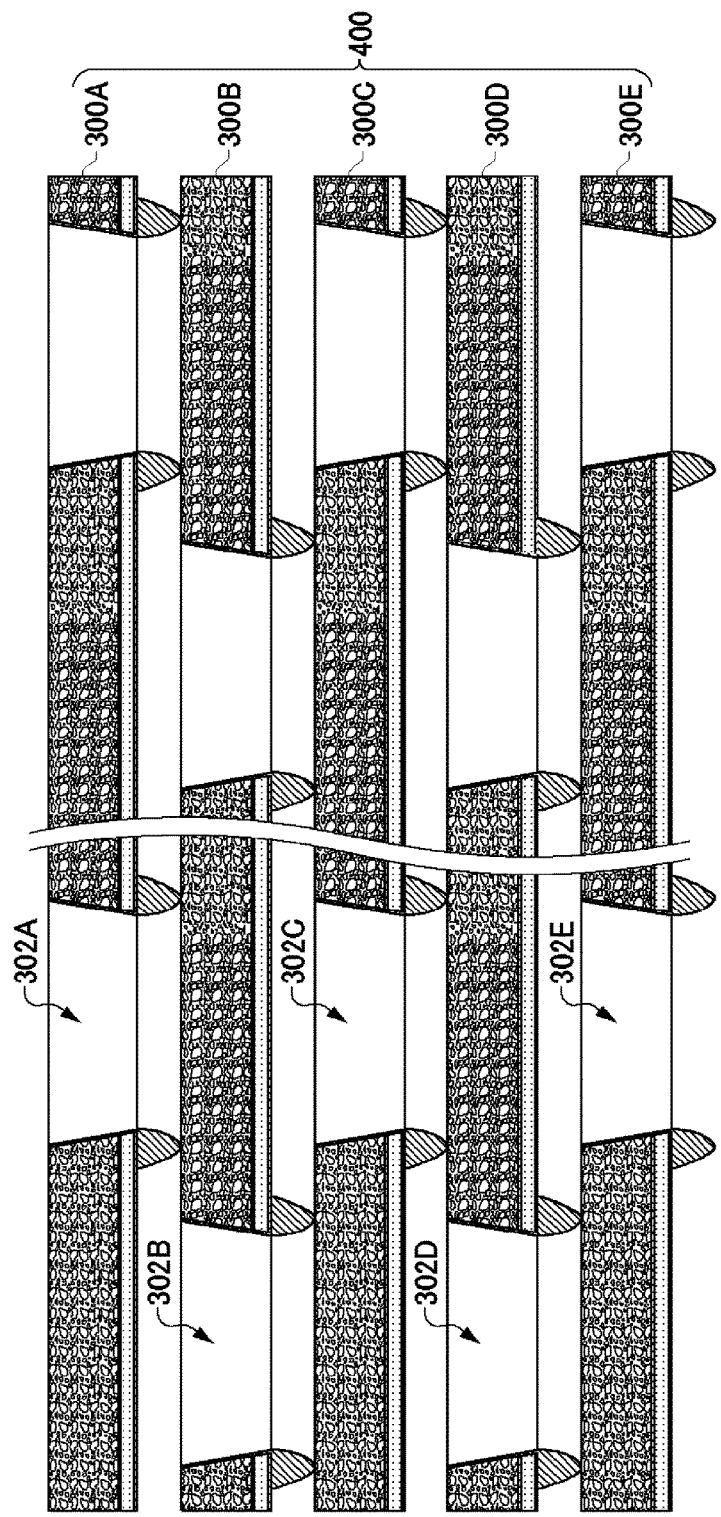
FIG. 2 is one example of a partial cross-sectional view of a heat insulating material formed by stacking a plurality of heat insulating sheets according to the present embodiment.

FIG. 2 is one example of a partial cross-sectional view of a heat insulating material 400 formed by stacking a plurality of the heat insulating sheets 300 according to the present embodiment. The heat insulating material 400 is configured by stacking heat insulating sheets 300A, 300B, 300C, 300D and 300E. Here, the heat insulating sheets 300A, 300B, 300C, 300D and 300E have through-holes 302A, 302B, 302C, 302D and 302E. When the heat insulating sheets 300A, 300B, 300C, 300D and 300E are superimposed, the through-holes 302A, 302B, 302C, 302D and 302E function as passages for discharging air remaining between the heat insulating sheets 300A, 300B, 300C, 300D and 300E to the outside. Thereby, gaps between the heat insulating sheets 300A, 300B, 300C, 300D and 300E can be evacuated, and the insulation property of the heat insulating material 400 can be improved.

The heat insulating sheets 300A, 300B, 300C, 300D and 300E have a plurality of through-holes formed by heat needles. However, at least some of the through-holes formed in each of the heat insulating sheets 300A, 300B, 300C, 300D and 300E are desirably not formed such that their positions match positions of through-holes in another heat insulating sheet. Thereby, it is possible to prevent at least some of the through-holes from overlapping with one another in a stacking direction, and it is possible to further suppress passage of infrared via the through-holes. Note that the through-holes may be formed by using a technique other than heat needles such as thermal spraying or laser processing.

For example, each of the through-holes 302A, 302B, 302C, 302D and 302E formed in the heat insulating sheets 300A, 300B, 300C, 300D and 300E may be provided at a position that does not overlap with one another in a stacking direction. Thereby, even if a plurality of through-holes are formed in each of the heat insulating sheets 300A, 300B, 300C, 300D and 300E, it is possible to further suppress passage of infrared via the through-holes 302A, 302B, 302C, 302D and 302E. Therefore, the insulation property of the heat insulating material 400 hardly lowers due to a plurality of the through-holes being formed in each of the heat insulating sheets 300A, 300B, 300C, 300D and 300E.

At least some of through-holes formed in the heat insulating sheet may be formed at positions that do not overlap with at least some of through-holes formed in another adjacent heat insulating sheet. In other words, as long as lowering of the insulation property of a heat insulating material is suppressed, some of through-holes formed in a heat insulating sheet may be formed at positions that overlap with some of through-holes formed in another adjacent heat insulating sheet. Note that the phrase "positions that do not overlap" means that at least 70% of all the through-holes formed in a heat insulating sheet are positioned so that they do not overlap with through-holes formed in another adjacent heat insulating sheet.

Here, as in Patent Literature 1, in a case that low radiation rate layers and low thermal conductivity layers are alternately stacked, the low radiation rate layers may contact each other via through-holes formed by fixing materials, and the insulation property may lower.

In contrast, in the heat insulating sheet 300 according to the present embodiment, the protruding portions 304 protruding from the surface of the metal vapor-deposited sheet 100 on the opposite side of the surface on which the non-woven fabric sheet 200 is stacked function as a support between the heat insulating sheets 300. Accordingly, even if the plurality of heat insulating sheets 300 are stacked, contact between the metal vapor-deposited sheets 100 can be reduced, and it is possible to suppress lowering of the insulation property. Note that also if the protruding portions protrude from the surface of the non-woven fabric sheet 200 on the opposite side of the surface on which the metal vapor-deposited sheet 100 is stacked, similarly, contact between the metal vapor-deposited sheets 100 can be reduced, and it is possible to suppress lowering of the insulation property.

Also, for example, by fusing a part of the resins contained in the metal vapor-deposited sheet 100 and the non-woven fabric sheet 200 by sticking and drawing of heat needles, the protruding portions 304 can be formed at the peripheral parts of the through-holes with a part of the fused resins. Because a resin is contained in at least the surface of the protruding portion 304, the protruding portion 304 hardly contributes to the thermal conduction between the heat insulating sheets 300. Therefore, by stacking the heat insulating sheets 300 with the plurality of protruding portions 304 being sandwiched therebetween, it is possible to prevent lowering of the insulation property that may occur due to contact between the heat insulating sheets 300.

Also, in the heat insulating sheet 300 according to the present embodiment, the metal vapor-deposited sheet 100 and the non-woven fabric sheet 200 are welded together by melting a part of the resins contained in the metal vapor-deposited sheet 100 and the non-woven fabric sheet 200 by sticking and drawing of heat needles. Therefore, it is possible to suppress weight increase of the heat insulating sheet 300.

For example, by forming a plurality of through-holes in the heat insulating sheet 300 by sticking and drawing of heat needles, it becomes easier to push out air remaining between a plurality of the heat insulating sheets 300 when configuring the heat insulating material 400 by stacking the heat insulating sheets 300, and becomes easier to evacuate the space between the heat insulating sheets 300. In addition, for example, by forming a plurality of through-holes in the heat insulating sheet 300 by sticking and drawing of heat needles, a step of forming a plurality of through-holes in the heat insulating sheet 300 and a step of forming the protruding portions 304 on the heat insulating sheet 300 can be realized in a step of welding the metal vapor-deposited sheet 100 and the non-woven fabric sheet 200 together. Therefore, the productivity of the heat insulating sheet 300 can be improved.

Figure 3:
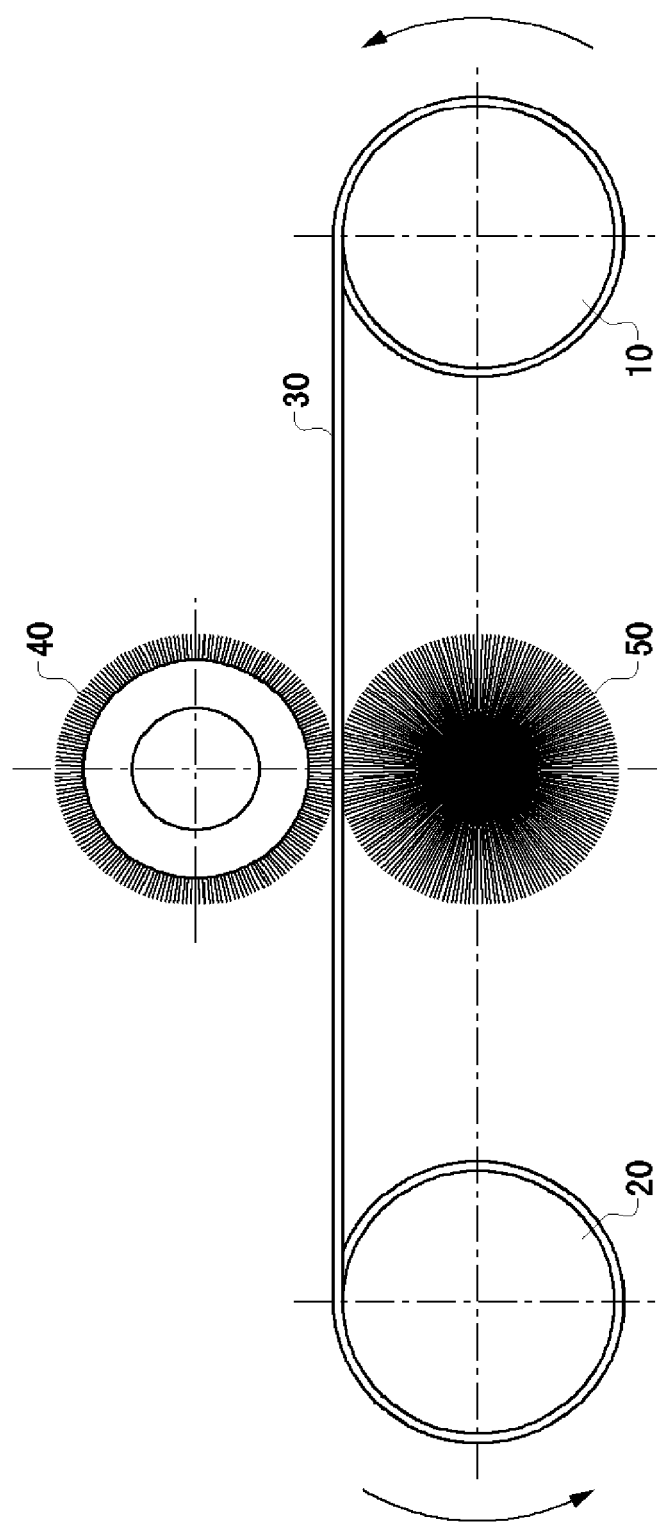
FIG. 3 is one example of a schematic view of a heat needle processing apparatus to manufacture a heat insulating sheet.

FIG. 3 is one example of a schematic view of a heat needle processing apparatus to manufacture the heat insulating sheet 300. The heat needle processing apparatus comprises conveyer rolls 10 and 20, a heat needle roll 40, and a brush roll 50. A plurality of heat needles are placed in a zigzag pattern on the heat needle roll 40.

The temperature of the heat needle roll 40 is raised to the melting point, or higher, of the resins contained in the metal vapor-deposited sheet 100 and the non-woven fabric sheet 200. The metal vapor-deposited sheet 100 and the non-woven fabric sheet 200 that are overlapped with one another are caused to pass between the heat needle roll 40 and the brush roll 50, and the heat needles are stuck into the metal vapor-deposited sheet 100 and the non-woven fabric sheet 200 to form a plurality of through-holes.

Here, the metal vapor-deposited sheet 100 may be placed on the brush roll 50 side, the non-woven fabric sheet 200 may be placed on the heat needle roll 40 side, and the heat needles may be stuck from a surface side of the non-woven fabric sheet 200 on the opposite side of the surface on which the metal vapor-deposited sheet 100 is stacked. Thereby, lowering of the productivity that maybe caused due to an entanglement between a brush provided on a surface of the brush roll 50 and the non-woven fabric sheet 200 can be suppressed. Also, the non-woven fabric sheet 200 may be placed on the brush roll 50 side, the metal vapor-deposited sheet 100 may be placed on the heat needle roll 40 side, and the heat needles may be stuck from a surface side of the metal vapor-deposited sheet 100 on the opposite side of the surface on which the non-woven fabric sheet 200 is stacked. Note that when heat needles are stuck from the surface side of the metal vapor-deposited sheet 100 on the opposite side of the surface on which the non-woven fabric sheet 200 is stacked, a roller such as a rubber roller that does not become entangled with the non-woven fabric sheet 200 is desirably used, instead of the brush roll 50.

Figure 4:
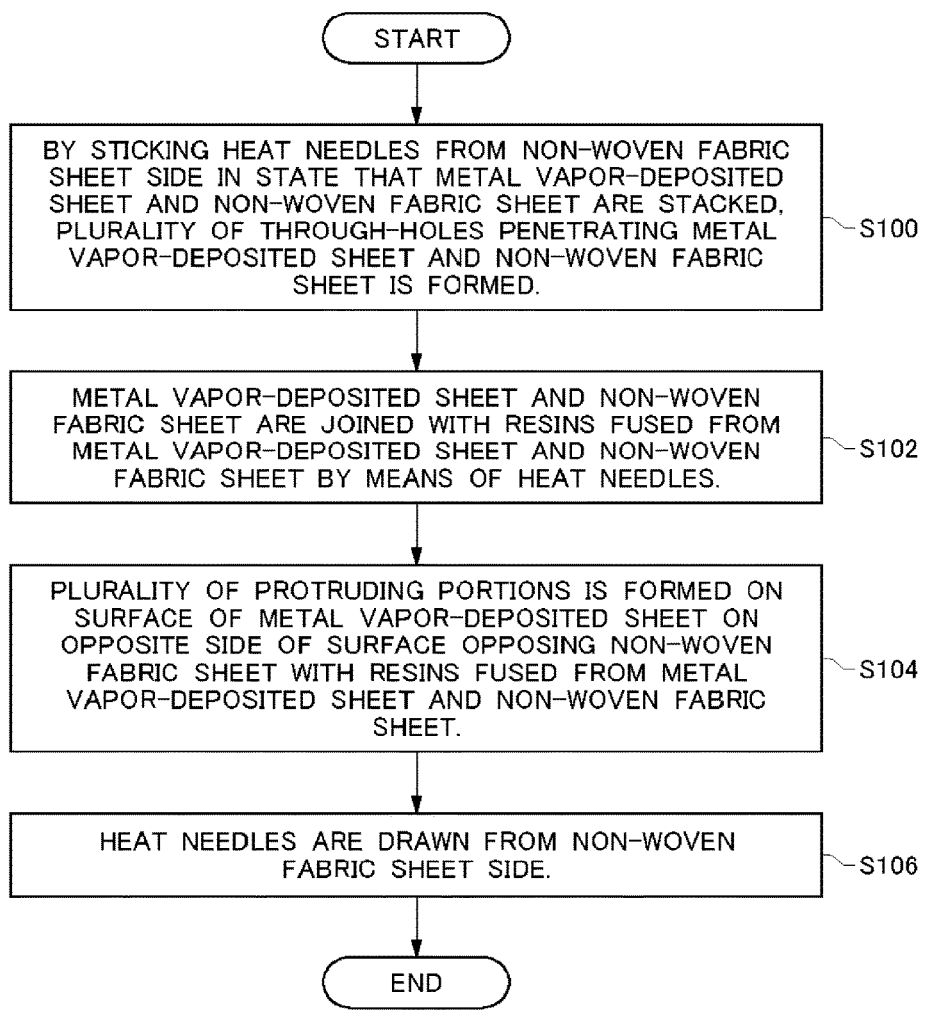
FIG. 4 is a flowchart that shows one example of manufacturing steps of a heat insulating sheet.

FIG. 4 is a flowchart that shows one example of manufacturing steps of the heat insulating sheet 300. By causing the metal vapor-deposited sheet 100 and the non-woven fabric sheet 200 to pass between the heat needle roll 40 and the brush roll 50 in a state that the metal vapor-deposited sheet 100 and the non-woven fabric sheet 200 are stacked, the heat needles are stuck from the non-woven fabric sheet 200 side, and a plurality of through-holes penetrating the metal vapor-deposited sheet 100 and the non-woven fabric sheet 200 is formed (S100).

By welding, onto inner walls of the plurality of through-holes, resins fused from the metal vapor-deposited sheet 100 and the non-woven fabric sheet 200 by means of the heat needles, the metal vapor-deposited sheet 100 and the non-woven fabric sheet 200 are joined (S102). Furthermore, the plurality of protruding portions 304 are formed along the outer peripheries of the plurality of through-holes 302 with the resins fused from the metal vapor-deposited sheet 100 and the non-woven fabric sheet 200 on the surface of the metal vapor-deposited sheet 100 on the opposite side of the surface on which the non-woven fabric sheet 200 is stacked (S104), and the heat needles are drawn from the non-woven fabric sheet 200 (S106).

In this manner, by sticking and drawing the heat needles in a state that the metal vapor-deposited sheet 100 and the non-woven fabric sheet 200 are superimposed, it is possible to join the metal vapor-deposited sheet 100 and the non-woven fabric sheet 200, form the plurality of through-holes 302, and further form the plurality of protruding portions 304 along the outer peripheries of the plurality of through-holes 302.

Also, the heat insulating material 400 can be manufactured by stacking a plurality of the heat insulating sheets manufactured by a manufacturing method such as the above-mentioned one while sandwiching the protruding portions 304.

Figure 5:
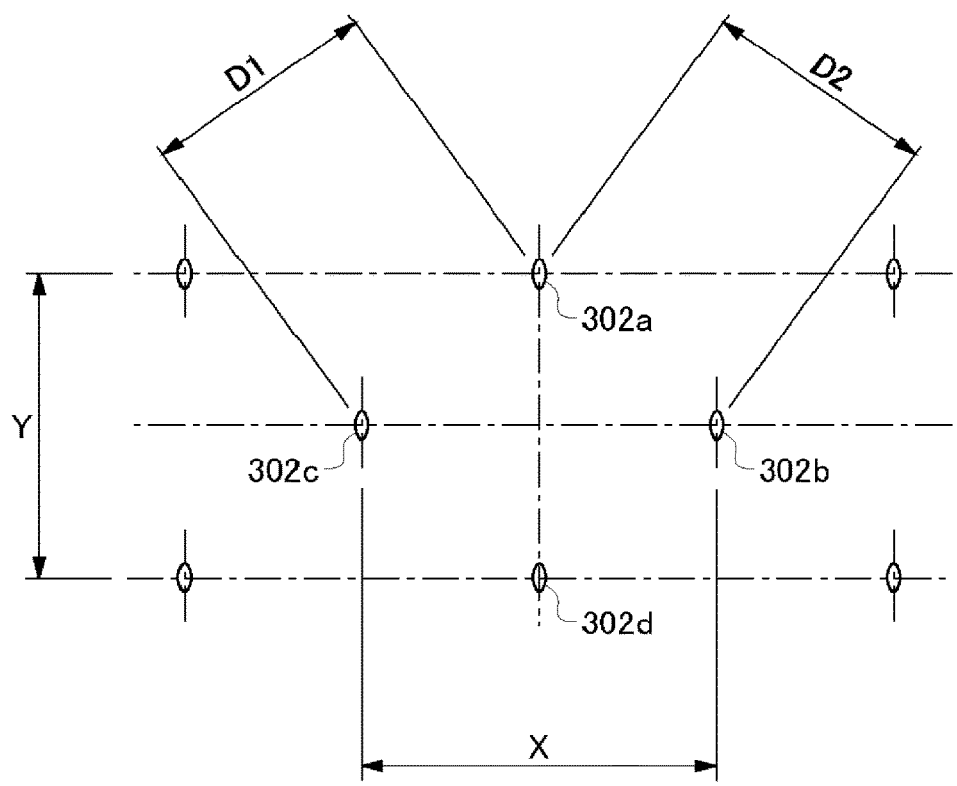
FIG. 5 is a diagram for explaining numeric values about through-holes.

FIG. 5 shows one example of an enlarged view of a part of the heat insulating sheet 300 as seen from the metal vapor-deposited sheet 100 side. A plurality of through-holes is formed in the heat insulating sheet 300 in a zigzag pattern. The through-holes 302 are formed by sticking heat needles while conveying the metal vapor-deposited sheet 100 and the non-woven fabric sheet 200 in the Y direction. Therefore, the through-holes 302 have an elliptical shape with the major axis along the Y direction. The distances from a through-hole 302a to adjacent through-holes 302b and 302c are a distance D1 and a distance D2, respectively. The distance between the through-hole 302b and the through-hole 302c that are placed along the X direction orthogonal to the conveying direction is a distance X. The distance between the through-hole 302a and a through-hole 302d placed along the Y direction parallel with the conveying direction is a distance Y.

Figure 6:
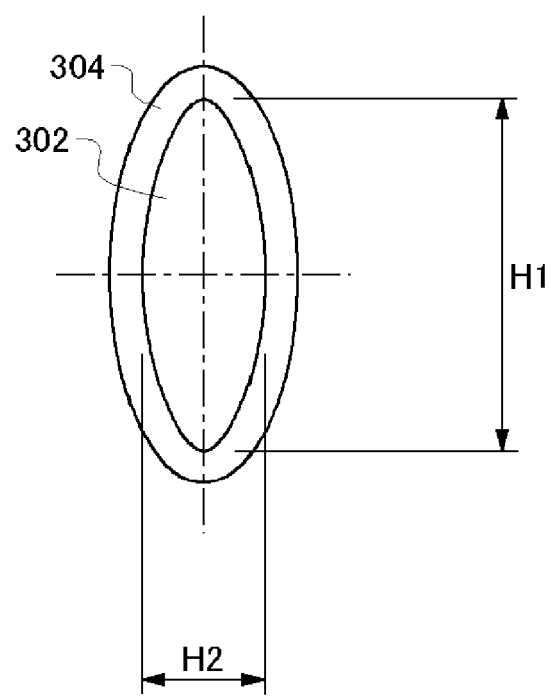
FIG. 6 is a diagram for explaining numeric values about a through-hole.

FIG. 6 shows one example of an enlarged view of the through-hole 302. The length of the major axis of the through-hole 302 parallel with the conveying direction is a length H1, and the length of the minor axis of the through-hole 302 orthogonal to the conveying direction is a length H2.

FIG. 7 is a table that shows results obtained by measuring the insulation property of the heat insulating sheet 300 by changing the density of the non-woven fabric sheet 200 and the needle diameter of heat needles.

The resin layer of a metal vapor-deposited sheet used in this measurement of the insulation property was a polyester film called Lumirror CX40 manufactured by Toray Industries, Inc. A metal vapor-deposited sheet obtained by vacuum vapor-deposition of aluminum on both surfaces of this polyester film was used. The non-woven fabric sheet used for the measurement of the insulation property was Type 05TH wetted non-woven fabric made of polyester and manufactured by Hirose Paper Mfg Co., Ltd. The non-woven fabric sheet with the non-woven fabric density of 15 g/m$^2$ in the table was a wetted non-woven fabric called 05H-15 manufactured by Hirose Paper Mfg Co., Ltd. The non-woven fabric sheet with the non-woven fabric density of 8 g/m$^2$ was a wetted non-woven fabric called 05TH-8 manufactured by Hirose Paper Mfg Co., Ltd. The non-woven fabric sheet with the non-woven fabric density of 5 g/m$^2$ was a wetted non-woven fabric called 05TH-5 manufactured by Hirose Paper Mfg Co., Ltd.

The heat needles may be formed into a tapered shape whose outer diameter at the leading ends are smaller than the outer diameter at the base ends. The heat needles may have a conical shape which becomes bigger from the leading ends in the axial direction of the heat needles. The needle diameter of heat needles shown in FIG. 7 indicates the outer diameter at a part that is apart from the leading ends of the heat needles by a distance of 7 mm toward the base end side along the axial direction of the heat needles. Note that when the cross-sections of the heat needles have an elliptical shape, the needle diameter of heat needles indicates the major axis length of the ellipse at the aforementioned part. The heat needles may be stuck into a stacked sheet formed by overlapping the metal vapor-deposited sheet 100 and the non-woven fabric sheet 200 to a position of 0.5 mm to 6.5 mm from the leading ends of the heat needles toward the base end side along the axial direction of the heat needles to form through-holes in the stacked sheet.

The length H1 of the major axes of the through-holes 302 formed in the heat insulating sheet 300 and the maximum diameter of voids formed in the non-woven fabric sheet 200 were observed by using JSM-T20 which is a scanning electron microscope manufactured by JEOL Ltd., and measured by image processing. More specifically, five samples that were obtained by cutting a part of a surface of the non-woven fabric sheet 200 into 5-mm squares were prepared; images of these samples were captured by the scanning electron microscope at a magnification of 200×; a void that can allow the largest circle to be contained therein was identified from among voids included in the captured image; and the diameter of the largest circle that can be contained within the identified circle was measured as the maximum diameter.

The through-holes 302 were sequentially formed by using heat needles heated to 300° C. while conveying the metal vapor-deposited sheet 100 and the non-woven fabric sheet 200, in an overlapped state, at a linear velocity of approximately 20 m/min. Note that intervals of the heat needles were 17 mm. The heat insulating sheet 300 was cut into a piece with a width of 1000 mm and a length of approximately 630 mm to 730 mm; and the cut heat insulating sheet 300 was stacked, sewn at one side which has the width of 1000 mm, and then wrapped around a wrapping rod with a diameter of 200 mm; thereby, a heat insulating material constituted with 25 layers of the heat insulating sheet 300 was prepared.

The major axis length of the through-holes in the table indicates the average value of major axis lengths obtained by measurement of through-holes arbitrarily selected one per single sample heat insulating sheet, from among a plurality of through-holes formed in ten sample heat insulating materials configured under respective conditions.

Also, the amount of intruding heat (W/m$^2$) was measured by inserting the prepared heat insulating material into a boil-off-type calorimeter testing machine manufactured by JECC TORISHA Co., Ltd., and measuring the amount of evaporation of liquid nitrogen (LN$_2$), and the measurement results were used to determine the insulation property of the heat insulating material. The measurement was performed under the following conditions.

(1) Temperature condition: 77 K (low temperature side)/300 K (high temperature side)

(2) Degree of vacuum: $1 \times 10^{-3}$ Pa to $1 \times 10^{-5}$ Pa (3) Duration of measurement: 24 h after the intermediate layer temperature of the heat insulating material reached a point where much increase cannot be expected further (Δ1° C./1 h), and the average per hour of the evaporated nitrogen gas amount reached a point where increase cannot be expected further (Δ10 cc/1 h).

(4) Measurement interval: 20 sec (5) Equipment used for measurement of the nitrogen gas flow amount: Mass flow meter SEF-405 manufactured by HORIBA STEC, Co., Ltd. (specified flowrate range 500 SCCM, flowrate accuracy±1%).

(6) Equipment used for measurement of the nitrogen gas temperature: Sheethed K Thermocouple of JIS Class 1 manufactured by CHINO Corporation.

(7) Data logger: NR-1000 manufactured by KEYENCE CORPORATION.

Note that the insulation property in the table indicates the average value of the amounts of intruding heat measured about the heat insulating material constituted with the 25 layer heat insulating sheet. Also, the sample corresponding to the insulation property indicated as the conventional method in the table is a heat insulating material configured by stacking 25 layers of a metal vapor-deposited sheet that was obtained by vacuum vapor-deposition of aluminum on both surfaces of a polyester film called Lumirror CX40 manufactured by Toray Industries, Inc. and a net with the number of meshes of approximately 90/cm$^2$ formed by weaving fibers with the thickness of approximately 200 μm that are made of polyester.

Here, by making the void maximum diameter of a non-woven fabric sheet small, it is possible to prevent the protruding portions 304 from being embedded in voids of the non-woven fabric sheet. However, the void maximum diameter of the non-woven fabric sheet is desirably made not too small because, thereby, increase in the density of the non-woven fabric sheet can be further suppressed, increase in the surface contact area between the metal vapor-deposited sheet and the non-woven fabric sheet can be further suppressed, and lowering of the insulation property can be further suppressed.

Also, by making the diameter of the through-holes 302 larger and the diameter of the protruding portions 304 larger, it is possible to prevent the protruding portions 304 from being embedded in voids of the non-woven fabric sheet. However, the diameter of the through-holes 302 is desirably made not too large because, thereby, it is possible to further suppress infrared radiant heat from passing from the through-holes 302 and to further suppress lowering of the insulation property.

Accordingly, when compared with the insulation property of the sample in the conventional method, desirably the length H1 of the major axes of the through-holes 302 (diameter of a melted ring) is within a range of 50 to 2000 μm, and the void maximum diameter of the non-woven fabric sheet is within a range of 50 to 500 µm. Furthermore, more desirably, the length H1 of the major axes of the through-holes 302 (diameter of a melted ring) is within a range of 50 to 1700 µm, and the void maximum diameter of the non-woven fabric sheet is within a range of 50 to 400 µm. Also, further desirably, the length H1 of the major axes of the through-holes 302 (diameter of a melted ring) is within a range of 300 to 1700 µm, and the void maximum diameter of the non-woven fabric sheet is within a range of 60 to 400 µm. Also, the length H1 of the major axes of the through-holes 302 (diameter of a melted ring) may be within a range of 50 to 1000 µm.

FIG. 8 is a table that shows one example of measurement results of numeric values about through-holes formed in the heat insulating sheet 300 which is an evaluation sample. The respective numeric values in the table are values about parameters shown in FIG. 5 and FIG. 6. A digital scope manufactured by SCHOTT MORITEX Corporation was used for the measurement of numeric values about through-holes.

The resin layer of the metal vapor-deposited sheet 100 used in the heat insulating sheet 300 of an evaluation sample was a polyester film (Lumirror CX40 manufactured by Toray Industries, Inc.). Then, vacuum vapor-deposition of aluminum was performed on both surfaces of the polyester film to form the metal vapor-deposited sheet 100. Note that the thickness of the AL vapor-deposited film was 9 µm. Also, the non-woven fabric sheet 200 was 05TH-5 (weight per unit area: 5 g/m$^2$) made of polyester and manufactured by Hirose Paper Mfg Co., Ltd. Furthermore, the needle diameter of heat needles used for forming the through-holes 302 was 0.7 mm. Also, the insulation property of the sample heat insulating sheet 300 was 0.63 W/m$^2$.

The average of the distances X between the through-holes 302 formed in the sample heat insulating sheet 300 was 25.12. Furthermore, the distance Y was 22.62. The average of the distances D1 was 16.88 mm. Also, the average of the distances D2 was 16.90. The average of the lengths H1 of the major axes and the average of the lengths H2 of the minor axes of the through-holes were 1.21 mm and 0.44 mm, respectively. The average of the area of the through-holes was 0.438 mm$^2$. The number of through-holes per 1 m$^2$ was 3,520. The area of the through-holes per 1 m$^2$ was 1,531 mm$^2$. Furthermore, the aperture ratio which is an occupancy ratio of through-holes per 1 m$^2$ was 0.15%.

Considering the measurement results shown in FIG. 7, the needle diameter of heat needles is desirably 0.1 mm to 3.0 mm, and more desirably 0.1 to 2.4 mm. Also, the non-woven fabric density is desirably 2 g/m$^2$ to 20 g/m$^2$ and more desirably 2 g/m$^2$ to 15 g/m$^2$.

Considering the measurement results shown in FIG. 7 and FIG. 8, the distance X and distance Y in a case of the heat insulating material configured at least under the above-mentioned conditions are desirably within a range of 10 mm to 50 mm, and further desirably within a range of 20 mm to 30 mm. The distance D1 and distance D2 are desirably within a range of 5 mm to 40 mm, and further desirably within a range of 10 mm to 20 mm. The length H1 of the major axes of the through-holes is desirably within a range of 50 µm to 4000 µm, more desirably within a range of 50 µm to 2000 µm, and further desirably within a range of 300 µm to 1700 µm. The length H2 of the minor axes of the through-holes is desirably within a range of 20 µm to 1000 µm, and more desirably within a range of 40 µm to 800 µm. The length H2 of the minor axes of the through-holes may be 70 µm or smaller, and may further be 55 µm or smaller. Also, the aperture ratio of through-holes is desirably 0.05% to 1.1%, and more desirably 0.10% to 0.50%. The aperture ratio of through-holes is further desirably 0.10% to 0.20%.

FIG. 9 is a table that shows one example of measurement results about the height H of through-holes formed in the heat insulating sheet 300 which is an evaluation sample used in the measurement shown in FIG. 8. Here, as shown in FIG. 1, the height H indicates the height from the surface 101 of the metal vapor-deposited sheet 100 on the opposite side of the surface on which the non-woven fabric sheet 200 is stacked.

The height H was calculated by subtracting the thickness B from the thickness A, where the thickness B is the thickness of ten layers of stacked sheets each formed by stacking an AL deposition sheet and a non-woven fabric sheet in which through-holes are not formed by heat needles, and the thickness A is the thickness of ten layers obtained by stacking one layer of a heat insulating sheet formed by stacking an AL deposition sheet and a non-woven fabric sheet in which through-holes are formed by heat needles, and nine layers of stacked sheets each formed by stacking an AL deposition sheet and a non-woven fabric sheet in which through-holes are not formed by heat needles.

The thickness A and thickness B were measured at the measurement pressure of 0.24±0.01 KPa in a state that a digimatic gauge (smallest scale=1 µm, measurement pressure=0.3 N) manufactured by Mitutoyo Corporation was fixed to a stand (measurement table: 58 mm, flatness 1.3 µm or lower) manufactured by Mitutoyo Corporation, and a ten-layer stacked sheet was sandwiched between the measurement table and a 26-mm×76-mm×thickness 3±0.1-mm (flatness 2 µm or lower) glass plate. Note that the stacked sheet in which through-holes were formed was stacked as a fifth layer from the measurement pressure side, and the difference from a heat insulating sheet in which through-holes were not formed was measured. As a result of measurement, the average of the heights H of the through-holes 302 formed in the sample heat insulating sheet 300 was 32 µm.

Considering the measurement results shown in FIG. 9, in a case of the heat insulating material configured at least under the above-mentioned conditions, the height of the through-holes is desirably 5 µM or larger. Also, by making the height H of through-holes 250 µm or smaller, the thickness of the heat insulating material configured by stacking a plurality of the heat insulating sheets 300 can be made thinner.

In the above-mentioned embodiment, an example in which the metal vapor-deposited sheet 100 formed by vapor-deposition of the metal layer 104 and the metal layer 106 on both surfaces of the resin layer 102 is used was explained. However, the metal vapor-deposited sheet 100 may have only one surface on which a metal layer is vapor-deposited. For example, the heat insulating sheet 300 may be configured by stacking the metal layer 104 on one surface side of the resin layer 102 and stacking the non-woven fabric sheet 200 on a surface side of the resin layer 102 on an opposite side of a surface on which the metal layer 104 is stacked. Then, the through-holes 302 penetrating the metal vapor-deposited sheet 100 and the non-woven fabric sheet 200 may be formed, and the protruding portions 304 protruding from a surface of the metal layer 104 on an opposite side of a surface on which the resin layer 102 is stacked may be formed around the through-holes 302.

Figure 10:
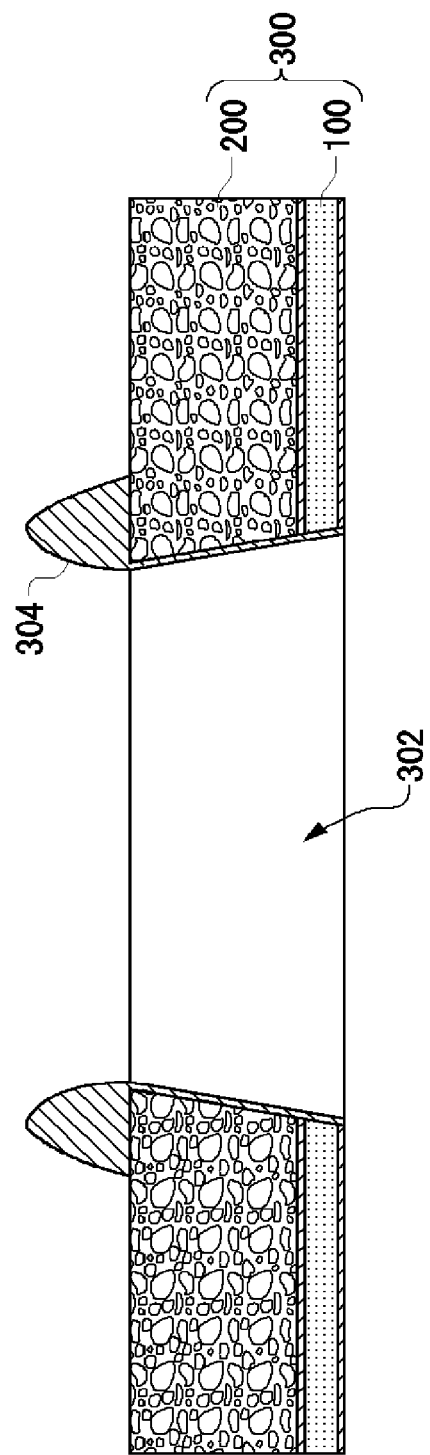
FIG. 10 is one example of a partial cross-sectional view of a heat insulating sheet according to another example.
Figure 11:
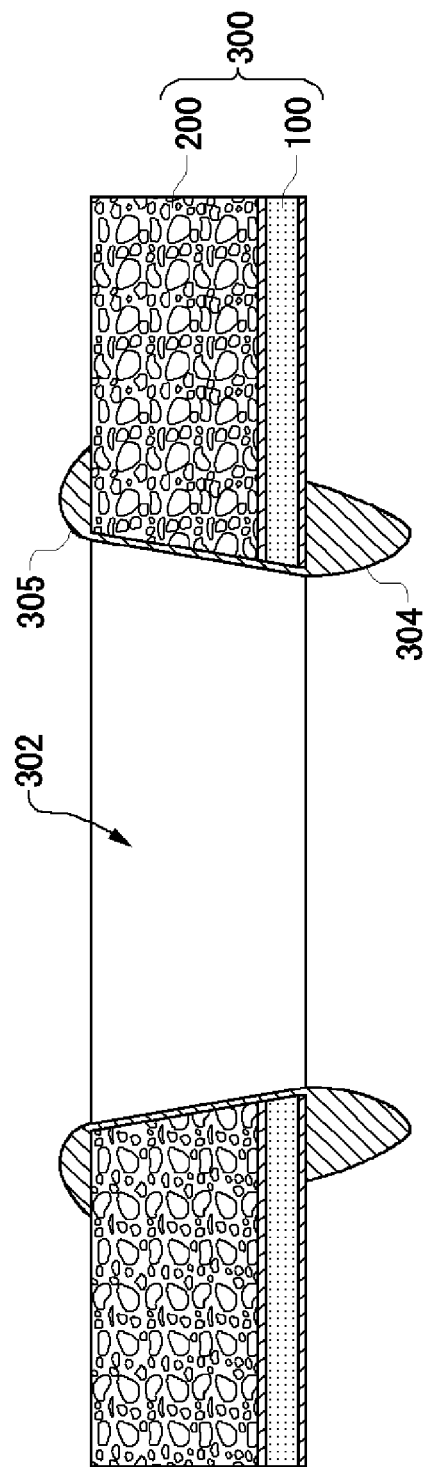
FIG. 11 is one example of a partial cross-sectional view of a heat insulating sheet according to another example.

In the above-mentioned embodiment, an example in which the through-holes 302 and the protruding portions 304 are formed by sticking and drawing heat needles from the surface side of the non-woven fabric sheet 200 on the opposite side of the surface on which the metal vapor-deposited sheet 100 is stacked was explained. However, when the through-holes 302 and the protruding portions 304 are formed by sticking and drawing heat needles, the protruding portions 304 protruding from the surface of the non-woven fabric sheet 200 on the opposite side of the surface on which the metal vapor-deposited sheet 100 is stacked may be formed as shown in FIG. 10 by sticking and drawing heat needles from the surface side of the metal vapor-deposited sheet 100 on the opposite side of the surface on which the non-woven fabric sheet 200 is stacked. Also, as shown in FIG. 11, in addition to the protruding portions 304 protruding from the surface of the metal vapor-deposited sheet 100 on the opposite side of the surface on which the non-woven fabric sheet 200 is stacked, a protruding portion 305 protruding from the surface of the non-woven fabric sheet 200 on the opposite side of the surface on which the metal vapor-deposited sheet 100 is stacked may be formed.

Further, without using the non-woven fabric sheet 200, for example, the heat insulating material may be formed by forming a plurality of protruding portions with a resin on both surfaces or one surface of the metal vapor-deposited sheet formed by vapor-deposition of metal on both surfaces or one surface of a resin layer such as a polyester film, and by stacking a plurality of the metal vapor-deposited sheets on which the protruding portions are formed. As described above, the protruding portions may be formed together with through-holes by sticking and drawing of heat needles, or may be formed by another technique such as coating of a material such as a resin for forming the protruding portions on both surfaces or one surface of the metal vapor-deposited sheet. Also, the heat insulating sheet 300 may have the protruding portion 305 formed along the outer peripheries of the through-holes 302 and other protruding portions that are independent of the through-holes 302 and formed with a resin. Note that the other protruding portions may be formed by a technique such as coating of a material such as a resin.

Figure 12:
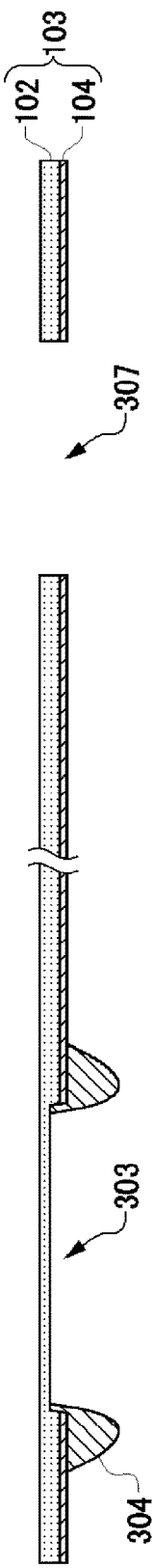
FIG. 12 is one example of a partial cross-sectional view of a heat insulating sheet according to another example.

As shown in FIG. 12, the heat insulating sheet may be configured by forming an opening 303 not penetrating the metal vapor-deposited sheet 103 in the metal vapor-deposited sheet 103 in which the metal layer 104 is vapor-deposited on one surface of the resin layer 102, and forming the protruding portion 304 around the opening 303. The opening 303 is formed on the surface of the metal layer 104 on the opposite side of the surface on which the resin layer 102 is stacked. The opening 303 penetrates the metal layer 104, but does not penetrate the resin layer 102. The protruding portion 304 is formed along the edge of the opening 303 to protrude from the surface of the metal layer 104 on the opposite side of the surface on which the resin layer 102 is stacked. The opening 303 may be formed by sticking and drawing a heat needle whose sticking depth is adjusted so that it will not penetrate the metal vapor-deposited sheet 103. Also, the metal vapor-deposited sheet 103 may have another through-hole 307 penetrating the resin layer 102 and the metal layer 104 at a position that is different from the position of the opening 303 and is on the surface of the metal layer 104 on the opposite side of the surface on which the resin layer 102 is stacked. Thereby, when a plurality of the metal vapor-deposited sheets 103 are stacked by sandwiching the protruding portion 304, gaps between the plurality of metal vapor-deposited sheets 103 can be evacuated through the other through-hole 307 even if the opening 303 does not penetrate the metal vapor-deposited sheet 103.

Figure 13:
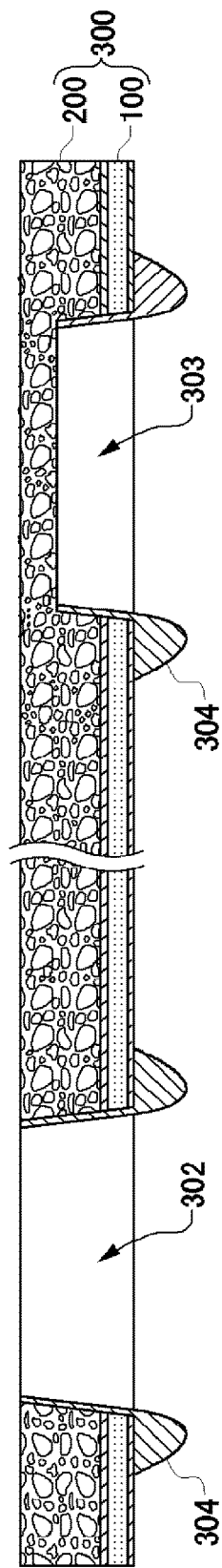
FIG. 13 is one example of a partial cross-sectional view of a heat insulating sheet according to another example.

As shown in FIG. 13, the heat insulating sheet 300 in which the non-woven fabric sheet 200 is stacked on one surface of the metal vapor-deposited sheet 100 may have the through-hole 302 and the opening 303. The through-hole 302 penetrates the metal vapor-deposited sheet 100 and the non-woven fabric sheet 200. The protruding portion 304 protruding from the surface of the metal vapor-deposited sheet 100 on the opposite side of the surface on which the non-woven fabric sheet 200 is stacked is formed around the through-hole 302 and along the edge of the through-hole 302. The opening 303 is formed on the surface of the metal vapor-deposited sheet 100 on the opposite side of the surface on which the non-woven fabric sheet 200 is stacked, and penetrates the metal vapor-deposited sheet 100, but does not penetrate the non-woven fabric sheet 200. The protruding portion 304 protruding from the surface of the metal vapor-deposited sheet 100 on the opposite side of the surface on which the non-woven fabric sheet 200 is stacked is formed around the opening 303 and along the edge of the opening 303. In this manner, the heat insulating sheet 300 may be configured by forming the protruding portions 304 around a hole penetrating the heat insulating sheet 300 and a hole not penetrating the heat insulating sheet 300, respectively. Note that the through-hole 302 and the opening 303 may be formed by sticking and drawing heat needles with difference lengths from the surface of the metal vapor-deposited sheet 100 on the opposite side of the surface on which the non-woven fabric sheet 200 is stacked.

Figure 14:
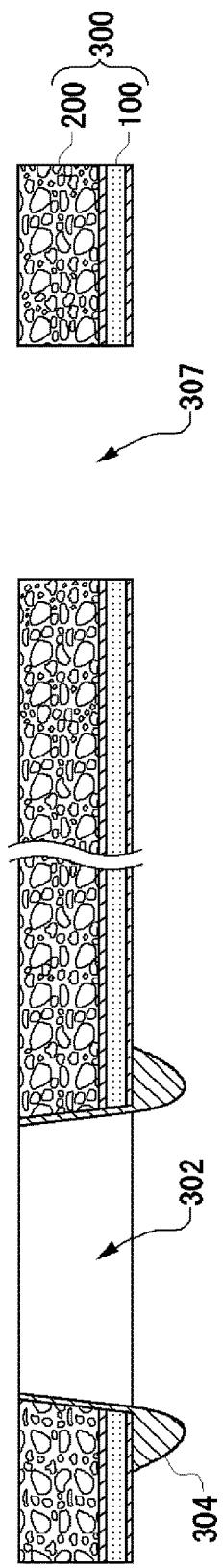
FIG. 14 is one example of a partial cross-sectional view of a heat insulating sheet according to another example.

As shown in FIG. 14, the heat insulating sheet 300 in which the non-woven fabric sheet 200 is stacked on one surface of the metal vapor-deposited sheet 100 may have the through-hole 302 and the other through-hole 307. The through-hole 302 and the other through-hole 307 penetrate the metal vapor-deposited sheet 100 and the non-woven fabric sheet 200. The protruding portion 304 protruding from the surface of the metal vapor-deposited sheet 100 on the opposite side of the surface on which the non-woven fabric sheet 200 is stacked is formed around the through-hole 302 and along the edge of the through-hole 302. On the other hand, a protruding portion is not formed around the other through-hole 307. In this manner, the heat insulating sheet 300 may have the through-hole 302 having the edge along which the protruding portion 304 is formed, and the other through-hole 307 around which the protruding portion 304 is not formed. The through-hole 302 may be formed by sticking and drawing a heat needle from the surface of the metal vapor-deposited sheet 100 on the opposite side of the surface on which the non-woven fabric sheet 200 is stacked, or from the surface of the non-woven fabric sheet 200 on the opposite side of the surface on which the metal vapor-deposited sheet 100 is stacked. The other through-hole 307 may be formed by utilizing a technique such as punching or laser processing.

As shown in FIG. 15, the heat insulating sheet 300 in which the non-woven fabric sheet 200 is stacked on one surface of the metal vapor-deposited sheet 100 may have the opening 303 and the other through-hole 307. The opening 303 is formed on the surface of the metal vapor-deposited sheet 100 on the opposite side of the surface on which the non-woven fabric sheet 200 is stacked, and penetrates the metal vapor-deposited sheet 100, but does not penetrate the non-woven fabric sheet 200. The protruding portion 304 protruding from the surface of the metal vapor-deposited sheet 100 on the opposite side of the surface on which the non-woven fabric sheet 200 is stacked is formed around the opening 303 and along the edge of the opening 303. Also, the heat insulating sheet 300 may have the other through-hole 307 penetrating the metal vapor-deposited sheet 100 and the non-woven fabric sheet 200 at a position that is different from the position of the opening 303 and is on the surface of the metal vapor-deposited sheet 100 on the opposite side of the surface on which the non-woven fabric sheet 200 is stacked. The opening 303 may be formed by sticking and drawing a heat needle whose sticking depth is adjusted not to penetrate the non-woven fabric sheet 200. The other through-hole 307 may be formed by utilizing a technique such as punching or laser processing.

Note that a metal vapor-deposited sheet having one surface on which a metal layer has been vapor-deposited may be used for the metal vapor-deposited sheet 100 used in the heat insulating sheet 300 as shown in FIG. 13 to FIG. 15. Then, the protruding portion 304 may be formed on a surface side of the metal vapor-deposited sheet on which the metal layer has been vapor-deposited, and the non-woven fabric sheet 300 may be placed on the surface side of the metal vapor-deposited sheet on the opposite side of the surface on which the metal layer has been vapor-deposited.

FIG. 16 shows results of measuring the insulation property of the heat insulating sheet 300 comprising the through-hole 302 having the protruding portion 304 therearound, and the other through-hole 307 not having a protruding portion therearound.

The resin layer of a metal vapor-deposited sheet used in this measurement of the insulation property was a polyester film called Lumirror CX40 manufactured by Toray Industries, Inc. A metal vapor-deposited sheet obtained by vacuum vapor-deposition of aluminum on both surfaces of this polyester film was used. The non-woven fabric sheet used for the measurement of the insulation property was Type 05TH wetted non-woven fabric made of polyester and manufactured by Hirose Paper Mfg Co., Ltd. The non-woven fabric sheet with the non-woven fabric density of 5 g/m$^2$ in the table was a wetted non-woven fabric called 05H-5 manufactured by Hirose Paper Mfg Co., Ltd.

The needle diameter of heat needles shown in FIG. 16 indicates the outer diameter at a part that is apart from the leading ends of the heat needles by a distance of 7 mm toward the base end side along the axial direction of the heat needles. Note that when the cross-sections of the heat needles have an elliptical shape, the needle diameter of heat needles indicates the major axis length of the ellipse at the aforementioned part. The heat needles were stuck into a stacked sheet formed by overlapping the metal vapor-deposited sheet 100 and the non-woven fabric sheet 200 to a position of 0.5 mm to 6.5 mm from the leading ends of the heat needles toward the base end side along the axial direction of the heat needles to form through-holes in the stacked sheet.

The length H1 of the major axes of the through-holes 302 formed in the heat insulating sheet 300 and the maximum diameter of voids formed in the non-woven fabric sheet 200 were observed by using JSM-T20 which is a scanning electron microscope manufactured by JEOL Ltd., and measured by image processing. More specifically, five samples that were obtained by cutting a part of a surface of the non-woven fabric sheet 200 into 5-mm squares were prepared; images of these samples were captured by the scanning electron microscope at a magnification of 200×; a void that can allow the largest circle to be contained therein was identified from among voids included in the captured image; and the diameter of the largest circle that can be contained within the identified circle was measured as the maximum diameter.

The through-holes 302 were sequentially formed by using heat needles heated to 300° C. while conveying the metal vapor-deposited sheet 100 and the non-woven fabric sheet 200, in an overlapped state, at a linear velocity of approximately 20 m/min. Note that intervals of the heat needles were 17 mm. The heat insulating sheet 300 was cut into a piece with a width of 1000 mm and a length of approximately 630 mm to 730 mm.

The other through-holes 307 were formed in the cut heat insulating sheet 300 by using a screwpunch manufactured by Nonaka Manufacturing Co., Ltd. The other through-holes 307 were formed in a grid pattern at intervals of 75 mm. The diameter of the other through-holes 307 was 1 mm. The 152 other through-holes 307 were formed per 1 m$^2$. The aperture ratio which is an occupancy ratio of the other through-holes 307 per 1 m$^2$ was 0.05%. The aperture ratio which is an occupancy ratio of the through-holes 302 and the other through-holes 307 per 1 m$^2$ was 0.20%.

The heat insulating sheet 300 in which the through-holes 302 and the other through-holes 307 were formed was stacked, sewn at one side which has the width of 1000 mm, and then wrapped around a wrapping rod with a diameter of 200 mm; thereby, a heat insulating material constituted with 25 layers of the heat insulating sheet 300 was prepared.

The major axis length of the through-holes 302 in the table indicates the average value of major axis lengths obtained by measurement of through-holes 302 arbitrarily selected one per single sample heat insulating sheet, from among a plurality of through-holes 302 formed in ten sample heat insulating materials configured under respective conditions.

Also, the amount of intruding heat (W/m$^2$) was measured by inserting the prepared heat insulating material into a boil-off-type calorimeter testing machine manufactured by JECC TORISHA Co., Ltd., and measuring the amount of evaporation of liquid nitrogen (LN$_2$), and the measurement results were used to determine the insulation property of the heat insulating material. The measurement was performed under the identical conditions to the above-mentioned conditions under which the measurement results shown in FIG. 7 were obtained.

Note that the insulation property in the table indicates the average value of the amounts of intruding heat measured about the heat insulating material constituted with the 25 layer heat insulating sheet. Also, the sample corresponding to the insulation property indicated as the conventional method in the table is a heat insulating material configured by stacking 25 layers of a metal vapor-deposited sheet that was obtained by vacuum vapor-deposition of aluminum on both surfaces of a polyester film called Lumirror CX40 manufactured by Toray Industries, Inc. and a net with the number of meshes of approximately 90/cm$^2$ formed by weaving fibers with the thickness of approximately 200 μm that are made of polyester.

As in the measurement results shown in FIG. 16, a heat insulating material having an excellent insulation property can be provided also by the heat insulating sheet 300 having the other through-holes 307 beside the through-holes 302.

FIG. 17 shows results obtained by measuring the insulation property of the heat insulating sheet 300 comprising the openings 303 having the protruding portions 304 therearound, and the other through-holes 307 not having protruding portions therearound.

The metal vapor-deposited sheet and non-woven fabric sheet used in this measurement of the insulation property are identical to the metal vapor-deposited sheet and non-woven fabric sheet from which the measurement results shown in FIG. 16 were obtained.

The length of the heat needles used for forming the openings 303 was 5 mm. The needle diameter of heat needles shown in FIG. 17 indicates the outer diameter at a part that is apart from the leading ends of the heat needles by a distance of 30 μm toward the base end side along the axial direction of the heat needles. Note that when the cross-sections of the heat needles have an elliptical shape, the needle diameter of heat needles indicates the major axis length of the ellipse at the aforementioned part. The heat needles were stuck into a stacked sheet formed by overlapping the metal vapor-deposited sheet 100 and the non-woven fabric sheet 200 to a position of 30 μm from the leading ends of the heat needles toward the base end side along the axial direction of the heat needles, and the openings 303 penetrating the metal vapor-deposited sheet 100 but not penetrating the non-woven fabric sheet 200 were formed in the stacked sheet.

A method of measuring the length H1 of the major axes of the openings 303 formed in the heat insulating sheet 300 and the maximum diameter of voids formed in the non-woven fabric sheet 200 was the identical method to that used when the measurement results shown in FIG. 16 were obtained.

The openings 303 were sequentially formed by using heat needles heated to 300° C. while conveying the metal vapor-deposited sheet 100 and the non-woven fabric sheet 200, in an overlapped state, at a linear velocity of approximately 20 m/min. Note that intervals of the heat needles were 17 mm. The heat insulating sheet 300 was cut into a piece with a width of 1000 mm and a length of approximately 630 mm to 730 mm.

The other through-holes 307 were formed in the cut heat insulating sheet 300 by using a screwpunch manufactured by Nonaka Manufacturing Co., Ltd. The other through-holes 307 were formed in a grid pattern at intervals of 45 mm. The diameter of the other through-holes 307 was 1 mm. The 450 other through-holes 307 were formed per 1 m². The aperture ratio which is an occupancy ratio of the other through-holes 307 per 1 m² was 0.14%.

The heat insulating sheet 300 in which the openings 303 and the other through-holes 307 were formed was stacked, sewn at one side which has the width of 1000 mm, and then wrapped around a wrapping rod with a diameter of 200 mm; thereby, a heat insulating material constituted with 25 layers of the heat insulating sheet 300 was prepared.

The major axis length of the openings 303 in the table indicates the average value of major axis lengths obtained by measurement of openings 303 arbitrarily selected one per single sample heat insulating sheet, from among a plurality of the openings 303 formed in ten sample heat insulating materials configured under respective conditions.

Also, the amount of intruding heat (W/m²) was measured by inserting the prepared heat insulating material into a boil-off-type calorimeter testing machine manufactured by JECC TORISHA Co., Ltd., and measuring the amount of evaporation of liquid nitrogen ($LN_2$), and the measurement results were used to determine the insulation property of the heat insulating material. The measurement was performed under the identical conditions to the above-mentioned conditions under which the measurement results shown in FIG. 7 and FIG. 16 were obtained.

Note that the insulation property in the table indicates the average value of the amounts of intruding heat measured about the heat insulating material constituted with the 25 layer heat insulating sheet. Also, the sample corresponding to the insulation property indicated as the conventional method in the table is a heat insulating material configured by stacking 25 layers of a metal vapor-deposited sheet that was obtained by vacuum vapor-deposition of aluminum on both surfaces of a polyester film called Lumirror CX40 manufactured by Toray Industries, Inc. and a net with the number of meshes of approximately 90/cm² formed by weaving fibers with the thickness of approximately 200 μm that are made of polyester.

As in the measurement results shown in FIG. 17, a heat insulating material having an excellent insulation property can be provided also by the heat insulating sheet 300 having the opening 303 and the other through-holes 307.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS 100, 103: metal vapor-deposited sheet
102: resin layer
104, 106: metal layer
200: non-woven fabric sheet
300: heat insulating sheet
302: through-hole
303: opening
304: protruding portion
305: protruding portion
306: extended portion
307: other through-hole
400: heat insulating material
H1: length of the major axis of a through-hole
H2: length of minor axis of a through-hole

What is claimed is:
1. A heat insulating sheet comprising:
a first thermal conduction suppressing layer that suppresses thermal conduction;
a first radiant heat reflecting layer that is placed on one surface side of the first thermal conduction suppressing layer and reflects radiant heat;
a second thermal conduction suppressing layer that is placed on another surface side of the first thermal conduction suppressing layer; and
a protruding portion protruding from a surface of the first radiant heat reflecting layer on an opposite side of a surface on which the first thermal conduction suppressing layer is stacked, the protruding portion containing a resin at least on its surface,
wherein
the first radiant heat reflecting layer has an opening on the surface on the opposite side of the surface on which the first thermal conduction suppressing layer is stacked, the opening being a through-hole penetrating the first radiant heat reflecting layer, the first thermal conduction suppressing layer, and the second thermal conduction suppressing layer, and the protruding portion is formed along an edge of the opening, the protruding portion having a joint portion that extends along an inner wall of the through-hole and joins the first thermal conduction suppressing layer and the second thermal conduction suppressing layer.

2. The heat insulating sheet according to claim 1, further comprising:
a second radiant heat reflecting layer that is placed on another surface side of the first thermal conduction suppressing layer, wherein the second thermal conduction suppressing layer is placed on a surface side of the second radiant heat reflecting layer on an opposite side of a surface on which the first thermal conduction suppressing layer is stacked.

3. The heat insulating sheet according to claim 1, wherein the heat insulating sheet further has another through-hole at a position that is different from a position of the opening on the surface of the first radiant heat reflecting layer on the opposite side of the surface on which the first thermal conduction suppressing layer is stacked, the other through-hole penetrating the first radiant heat reflecting layer, the first thermal conduction suppressing layer, and the second thermal conduction suppressing layer.

4. The heat insulating sheet according to claim 1, wherein
the first thermal conduction suppressing layer has a resin layer,
the second thermal conduction suppressing layer has a non-woven fabric layer containing resin fibers, and
the first radiant heat reflecting layer has a metal layer.

5. The heat insulating sheet according to claim 4, wherein the protruding portion is formed with a mixture of respective materials of the resin layer and the non-woven fabric layer.

6. The heat insulating sheet according to claim 4, wherein the protruding portion has a shape or size that does not allow entrance of the protruding portion into a void formed in the non-woven fabric layer.

7. The heat insulating sheet according to claim 1, wherein the protruding portion is formed with a resin contained in the first thermal conduction suppressing layer being fused, and being deposited on a surface of the first radiant heat reflecting layer on an opposite side of a surface on which the first thermal conduction suppressing layer is stacked.

8. A heat insulating sheet comprising:
a first thermal conduction suppressing layer that suppresses thermal conduction;
a first radiant heat reflecting layer that is placed on one surface side of the first thermal conduction suppressing layer and reflects radiant heat;
a second thermal conduction suppressing layer that is placed on another surface side of the first thermal conduction suppressing layer; and
a protruding portion formed with a resin contained in the first thermal conduction suppressing layer and the second thermal conduction suppressing layer being fused, and being deposited on at least one of a surface of the second thermal conduction suppressing layer on an opposite side of a surface on which the first thermal conduction suppressing layer is placed and a surface of the first radiant heat reflecting layer on an opposite side of a surface on which the first thermal conduction suppressing layer is stacked, the protruding portion containing the resin at least on its surface.

9. The heat insulating sheet according to claim 8, further comprising:
a second radiant heat reflecting layer that is placed on another surface side of the first thermal conduction suppressing layer,
wherein the second thermal conduction suppressing layer is placed on a surface side of the second radiant heat reflecting layer on an opposite side of a surface on which the first thermal conduction suppressing layer is stacked, the second thermal conduction suppressing layer having a non-woven fabric layer containing resin fibers, and
wherein the protruding portion is formed with the resin fibers, in addition to the resin, being fused, and being deposited on the surface of the first radiant heat reflecting layer on the opposite side of the surface on which the first thermal conduction suppressing layer is stacked.

10. The heat insulating sheet according to claim 8, wherein
the first radiant heat reflecting layer has an opening on the surface on the opposite side of the surface on which the first thermal conduction suppressing layer is stacked, and
the protruding portion is formed along an edge of the opening.

11. A heat insulating material formed by stacking a plurality of the heat insulating sheet according to claim 1 with the protruding portion being sandwiched therebetween.

12. The heat insulating material according to claim 11, wherein
the plurality of heat insulating sheets includes a first heat insulating sheet that has a first through-hole and a second heat insulating sheet that is placed to face the first heat insulating sheet and has a second through-hole, and
the first through-hole and the second through-hole are provided at positions that do not overlap with one another in a stacking direction of the plurality of heat insulating sheets.

13. A heat insulating material formed by stacking a plurality of heat insulating sheets according to claim 8 with the protruding portion being sandwiched therebetween.

14. The heat insulating sheet according to claim 2, wherein the second radiant heat reflecting layer includes a metal layer.

15. The heat insulating sheet according to claim 4, wherein the metal of the first radiant heat reflecting layer is made of aluminum, gold, silver, copper or nickel.

16. The heat insulating sheet according to claim 14, wherein the metal of the second radiant heat reflecting layer is made of aluminum, gold, silver, copper or nickel.

17. The heat insulating sheet according to claim 4, wherein
the resin layer of the first thermal conduction suppressing layer is formed with polyester, polyethylene, polypropylene or polyamide, and
the resin fibers of the second thermal conduction suppressing layer are formed with polyester, polyethylene, polypropylene or polyamide.

18. The heat insulating sheet according to claim 4, wherein a weight per unit area of the non-woven fabric layer is 2 g/m$^2$ or higher and 15 g/m$^2$ or lower.

19. The heat insulating sheet according to claim 10, wherein the opening is a through-hole penetrating the first radiant heat reflecting layer, the first thermal conduction suppressing layer and the second thermal conduction suppressing layer.

20. The heat insulating sheet according to claim 8, wherein
the first thermal conduction suppressing layer has a resin layer,
the second thermal conduction suppressing layer has a non-woven fabric layer containing resin fibers, and
the first radiant heat reflecting layer has a metal layer.

21. The heat insulating sheet according to claim 9, wherein the second radiant heat reflecting layer includes a metal layer.

22. The heat insulating sheet according to claim 20, wherein the metal of the first radiant heat reflecting layer is made of aluminum, gold, silver, copper or nickel.

23. The heat insulating sheet according to claim 21, wherein the metal of the second radiant heat reflecting layer is made of aluminum, gold, silver, copper or nickel.

24. The heat insulating sheet according to claim 20, wherein
the resin layer of the first thermal conduction suppressing layer is formed with polyester, polyethylene, polypropylene or polyamide, and
the resin fibers of the second thermal conduction suppressing layer are formed with polyester, polyethylene, polypropylene or polyamide.

25. The heat insulating sheet according to claim 20, wherein the protruding portion has a shape or size that does not allow entrance of the protruding portion into a void formed in the non-woven fabric layer.

26. The heat insulating sheet according to claim 20, wherein a weight per unit area of the non-woven fabric layer is 2 $g/m^2$ or higher and 15 $g/m^2$ or lower.

27. The heat insulating material according to claim 13, wherein the plurality of heat insulating sheets includes a
first heat insulating sheet that has a first through-hole and a second heat insulating sheet that is placed to face the first heat insulating sheet and has a second through-hole, and
the first through-hole and the second through-hole are provided at positions that do not overlap with one another in a stacking direction of the plurality of heat insulating sheets.

28. The heat insulating sheet according to claim 8, wherein the protruding portion has a joint portion that extends along an inner wall of the through-hole, and joins the first thermal conduction suppressing layer and the second thermal conduction suppressing layer.

* * * * *